(12) United States Patent
Papasakellariou

(10) Patent No.: US 11,757,575 B2
(45) Date of Patent: Sep. 12, 2023

(54) CARRIER AGGREGATION WITH VARIABLE TRANSMISSION DURATIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 17/303,028

(22) Filed: May 18, 2021

(65) Prior Publication Data

US 2021/0273749 A1 Sep. 2, 2021

Related U.S. Application Data

(63) Continuation of application No. 16/723,816, filed on Dec. 20, 2019, which is a continuation of application No. 15/628,360, filed on Jun. 20, 2017, now Pat. No. 10,541,785.

(60) Provisional application No. 62/363,542, filed on Jul. 18, 2016, provisional application No. 62/363,580, filed on Jul. 18, 2016, provisional application No. 62/364,473, filed on Jul. 20, 2016.

(51) Int. Cl.
*H04L 1/18* (2023.01)
*H04L 5/00* (2006.01)
(Continued)

(52) U.S. Cl.
CPC ......... *H04L 1/1812* (2013.01); *H04B 7/0413* (2013.01); *H04L 1/1822* (2013.01);
(Continued)

(58) Field of Classification Search
CPC ... H04W 28/04; H04W 72/04; H04W 72/042; H04W 88/08; H04W 72/0406;
(Continued)

(56) References Cited

U.S. PATENT DOCUMENTS

2010/0020758 A1* 1/2010 Kim ............... H04W 72/0446
370/329
2011/0159914 A1 6/2011 Chen et al.
(Continued)

FOREIGN PATENT DOCUMENTS

CN 102783226 A * 11/2012 .......... H04W 52/367
CN 104054378 A * 9/2014 .......... H04L 1/1861
(Continued)

OTHER PUBLICATIONS

3GPP TSG RAN WG1 Meeting #85, Nanjing, China, May 23-27, 2016, R1-164076, Agenda item: 6.2.1.3., Source: Huawei, HiSilicon, Title: UCI transmission for eLAA. (Year: 2016).*
(Continued)

*Primary Examiner* — Peter G Solinsky
*Assistant Examiner* — Sanjay K Dewan

(57) ABSTRACT

A method of a user equipment (UE) for constructing a hybrid automatic repeat request acknowledgement (HARQ-ACK) codebook. The method comprises receiving physical downlink control channels (PDCCHs) that convey respective downlink control information (DCI) formats, wherein each DCI format includes a counter field and a slot offset field, receiving physical downlink data channels (PDSCHs) that convey data transport blocks, detecting the DCI formats configuring the received PDSCHs, determining locations for HARQ-ACK bits in a HARQ-ACK codebook based on a value of the slot offset field and a value of the counter field in each detected DCI format, determining a time unit for transmission of the HARQ-ACK codebook based on a value of the slot offset field in each detected DCI format, and transmitting the HARQ-ACK codebook.

15 Claims, 21 Drawing Sheets

(51) Int. Cl.
| | |
|---|---|
| *H04B 7/0413* | (2017.01) |
| *H04W 72/04* | (2023.01) |
| *H04W 72/12* | (2023.01) |
| *H04L 1/1812* | (2023.01) |
| *H04L 1/1822* | (2023.01) |
| *H04L 1/1829* | (2023.01) |
| *H04W 72/20* | (2023.01) |
| *H04L 1/1867* | (2023.01) |
| *H04L 1/00* | (2006.01) |

(52) U.S. Cl.
CPC .......... *H04L 1/1854* (2013.01); *H04L 1/1861* (2013.01); *H04L 1/1864* (2013.01); *H04L 1/1896* (2013.01); *H04L 5/001* (2013.01); *H04L 5/0048* (2013.01); *H04L 5/0053* (2013.01); *H04L 5/0055* (2013.01); *H04L 5/0091* (2013.01); *H04W 72/20* (2023.01); *H04L 1/0061* (2013.01)

(58) Field of Classification Search
CPC ............. H04W 72/1278; H04B 7/0413; H04L 5/0007; H04L 1/1812; H04L 1/1822; H04L 1/1854; H04L 1/1861; H04L 1/1864; H04L 1/1896; H04L 5/001; H04L 5/0048; H04L 5/0053; H04L 5/0055; H04L 5/0091
USPC ....................................................... 370/329
See application file for complete search history.

(56) References Cited

U.S. PATENT DOCUMENTS

| | | | |
|---|---|---|---|
| 2012/0042091 A1 | 2/2012 | McCarthy et al. | |
| 2012/0069795 A1 | 3/2012 | Chung et al. | |
| 2012/0113944 A1* | 5/2012 | Yang | H04L 1/1671 370/329 |
| 2012/0207123 A1 | 8/2012 | Seo et al. | |
| 2012/0207213 A1 | 8/2012 | Amon | |
| 2012/0300711 A1 | 11/2012 | Wang et al. | |
| 2012/0320847 A1 | 12/2012 | Nam et al. | |
| 2013/0064215 A1 | 3/2013 | Gao et al. | |
| 2013/0094410 A1* | 4/2013 | Yang | H04L 1/1893 370/280 |
| 2013/0242816 A1 | 9/2013 | He et al. | |
| 2014/0029684 A1 | 1/2014 | Shirani-Mehr et al. | |
| 2014/0079040 A1 | 3/2014 | Smith et al. | |
| 2014/0086184 A1* | 3/2014 | Guan | H04L 5/0053 370/329 |
| 2014/0293932 A1 | 10/2014 | Papasakellariou et al. | |
| 2015/0249980 A1 | 9/2015 | You et al. | |
| 2016/0149627 A1* | 5/2016 | De Gaudenzi | H04L 1/08 370/329 |
| 2016/0150490 A1 | 5/2016 | Ouchi et al. | |
| 2016/0227571 A1 | 8/2016 | Baek et al. | |
| 2016/0249331 A1* | 8/2016 | Park | H04L 5/0053 |
| 2017/0135127 A1 | 5/2017 | Nogami et al. | |
| 2017/0373802 A1 | 12/2017 | Bergstrom et al. | |
| 2018/0242286 A1 | 8/2018 | Song et al. | |
| 2018/0242317 A1 | 8/2018 | Marinier et al. | |
| 2018/0270722 A1 | 9/2018 | Kim et al. | |
| 2019/0110290 A1 | 4/2019 | Sun et al. | |
| 2020/0267597 A1* | 8/2020 | Huang | H04L 1/1854 |
| 2020/0295878 A1 | 9/2020 | Choi et al. | |

FOREIGN PATENT DOCUMENTS

| | | | | |
|---|---|---|---|---|
| CN | 104320226 A | * | 1/2015 | ........... H04L 1/1864 |
| CN | 104396174 A | * | 3/2015 | ............... H04L 1/18 |
| KR | 10-2014-0037133 A | | 3/2014 | |
| KR | 10-2015-0041562 A | | 4/2015 | |
| WO | 2011082574 A1 | | 7/2011 | |
| WO | 2014018984 A1 | | 1/2014 | |

OTHER PUBLICATIONS

3GPP TSG RAN WG1 meeting #84 bis, Busan, Korea, Apr. 11-15, 2016, R1-162469, Agenda item: 7.3.1.3, Source: LG Electronics, Title: PUCCH design in LAA. (Year: 2016).*
USPTO Office Action dated Jul. 15, 2021 regarding co-pending U.S. Appl. No. 16/723,816, 63 pages.
Extended European Search Report dated Jul. 9, 2021 regarding Application No. 21167698.6, 7 pages.
"3rd Generation Partnership Project;Technical Specification Group Radio Access Network; Evolved Universal Terrestrial Radio Access (E-UTRA); Physical channels and modulation (Release 13)", 3GPP TS 36.211 V13.2.0, Jun. 2016, 168 Pages.
"3rd Generation Partnership Project;Technical Specification Group Radio Access Network; Evolved Universal Terrestrial Radio Access (E-UTRA); Multiplexing and channel coding (Release 13)", 3GPF TS 36.212 V13.2.0, Jun. 2016, 140 Pages.
"3rd Generation Partnership Project;Technical Specification Group Radio Access Network; Evolved Universal Terrestrial Radio Access (E-UTRA); Physical layer procedures (Release 13)", 3GPP TS 36.213 V13.2.0, 381 Pages.
"3rd Generation Partnership Project;Technical Specification Group Radio Access Network; Evolved Universal Terrestrial Radio Access (E-UTRA); Medium Access Control (MAC) protocol specification (Release 13)", 3GPP TS 36.321 V13.2.0 Jun. 2016, 91 Pages.
"3rd Generation Partnership Project;Technical Specification Group Radio Access Network; Evolved Universal Terrestrial Radio Access (E-UTRA); Radio Resource Control (RRC);Protocol specification (Release 13)", 3GPP TS 36.331 V13.2.0, Jun. 2016, 623 Pages.
International Search Report dated Oct. 19, 2017 in connection with International Patent Application No. PCT/KR2017/007458, 5 pages.
Huawei, HiSilicon, "Correction on HARQ-ACK ordering in case of semi-static codebook configuration of eCA", 3GPP TSG-RAN WG1 Meeting #84bis, R1-162142, Apr. 11-15, 2016, 26 pages.
Samsung, "Remaining Issues on HARQ-ACK Codebook Determination", 3GPP TSG RAN WG1 #84bis, R1-162645, 6 pages.
Huawei, HiSilicon, "Discussion on SPS HARQ-ACK bit handling in case of dynamic codebook configuration for eCA", 3GPP TSG RAN WG1 Meeting #84bis, R1-162105, Apr. 11-15, 2016, 5 pages.
Huawei, HiSilicon, "UCI transmission for eLAA", 3GPP TSG RAN WG1 Meeting #85, May 23-27, 2016, 6 pages.
Supplementary European Search Report dated Jun. 13, 2019 in connection with European Patent Application No. 17 83 1267, 8 pages.
China National Intellectual Property Administration, First Office Action regarding Application No. 201780044125 6, dated Apr. 1, 2021, 31 pages.
Huawei et al., "UCI transmission for eLAA", 3GPP TSG RAN WG1 Meeting #85, R1-164076, May 2016, 7 pages.
Decision of Patent dated Aug. 18, 2021 in connection with Korean Application No. 10-2021-7009732, 7 pages.
LG Electronics, "PUCCH design in LAA," R1-162469, 3GPP TSG RAN WG1 meeting #84bis, Busan, Korea, Apr. 11-15, 2016, 5 pages.
Korean Intellectual Property Office, Office Action dated Mar. 15, 2023 regarding Application No. 10-2022-7029620, 7 pages.
Korean Intellectual Property Office, Decision to Grant dated May 22, 2023 regarding Application No. 10-2022-7029620, 9 pages.

* cited by examiner

CARRIER AGGREGATION WITH VARIABLE TRANSMISSION DURATIONS

CROSS-REFERENCE TO RELATED APPLICATIONS AND CLAIM OF PRIORITY

This application is a continuation of U.S. Non-Provisional patent application Ser. No. 16/723,816, filed Dec. 20, 2019, which is a continuation of U.S. Non-Provisional patent application Ser. No. 15/628,360, filed Jun. 20, 2017, now U.S. Pat. No. 10,541,785, which claims priority to U.S. Provisional Patent Application No. 62/363,542, filed Jul. 18, 2016, U.S. Provisional Patent Application No. 62/363,580, filed Jul. 18, 2016, and U.S. Provisional Patent Application No. 62/364,473, filed Jul. 20, 2016. The content of the above-identified patent document is incorporated herein by reference.

TECHNICAL FIELD

The present application relates generally to a wireless communication system. More specifically, this disclosure relates to supporting transmissions with variable durations on different cells.

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-generation (5G) or 5G communication system to be provided for supporting higher data rates beyond $4^{th}$-generation (4G) communication system such as long term evolution (LTE). The present disclosure relates to enabling multiplexing for physical downlink control channel (PDCCH) transmissions over a system bandwidth (BW) to UEs with different BW reception capabilities; enabling carrier aggregation (CA) operation among carriers that support physical downlink shared channel (PDSCH) transmissions over different durations; determining an hybrid automatic repeat request acknowledgement (HARQ-ACK) codebook for CA operation among cells with different durations for respective PDSCH transmissions; supporting simultaneous transmissions from a UE on first one or more cells using a first duration and on second one or more cells using a second duration; designing a transmission power control process for overlapping transmissions from a UE on first one or more cells using a first duration and on second one or more cells using a second duration; defining prioritization mechanisms for power allocation from a UE to various signaling types with overlapping transmissions on first one or more cells using a first duration and on second one or more cells using a second duration; and defining define a power allocation method for a UE when the UE needs to simultaneously support multiple traffic services having different reception reliability requirements.

In one embodiment, a UE is provided. The UE comprises a transceiver configured to receive PDCCHs that convey respective downlink control information (DCI) formats, wherein each DCI format includes a counter field and a slot offset field and receive PDSCHs that convey data transport blocks. The UE further comprises a decoder configured to detect the DCI formats configuring the PDSCH receptions; and a controller configured to determine locations for HARQ-ACK bits in a HARQ-ACK codebook based on a value of the slot offset field and a value of the counter field in each detected DCI format and to determine a time unit for transmission of the HARQ-ACK codebook based on a value of the slot offset field in each detected DCI format. The UE further comprises the transceiver is further configured to transmit the HARQ-ACK codebook.

In another embodiment, a base station is provided. The base station comprises a transceiver configured to transmit PDCCHs that convey respective downlink control information (DCI) formats, wherein each DCI format includes a counter field and a slot offset field and transmit PDSCHs that are configured by the DCI formats and convey data transport blocks. The base station further comprises a controller configured to determine locations for HARQ-ACK bits in a HARQ-ACK codebook based on a value of the slot offset field and a value of the counter field in each transmitted DCI format and to determine a time unit for reception of the HARQ-ACK codebook based on a value of the slot offset field in each transmitted DCI format, wherein the transceiver is further configured to receive the HARQ-ACK codebook.

In yet another embodiment, a method of a UE for constructing a HARQ-ACK codebook is provided. The method comprises receiving PDCCHs that convey respective DCI formats, wherein each DCI format includes a counter field and a slot offset field, receiving PDSCHs that convey data transport blocks, detecting the DCI formats configuring the PDSCH receptions; determining locations for HARQ-ACK bits in a HARQ-ACK codebook based on a value of the slot offset field and a value of the counter field in each detected DCI format and determining a time unit for transmission of the HARQ-ACK codebook based on a value of the slot offset field in each detected DCI format, and transmitting the HARQ-ACK codebook.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v 13.2.0, "E-UTRA, Physical channels and modulation" (REF1); 3GPP TS 36.212 v 13.2.0, "E-UTRA, Multiplexing and Channel coding" (REF2); 3GPP TS 36.213 v 13.2.0, "E-UTRA, Physical Layer Procedures" (REF3); 3GPP TS 36.321 v 13.2.0, "E-UTRA, Medium Access Control (MAC) protocol specification;" (REF4) and 3GPP TS 36.331 v 13.2.0, "E-UTRA, Radio Resource Control (RRC) Protocol Specification" (REF5).

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FOAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
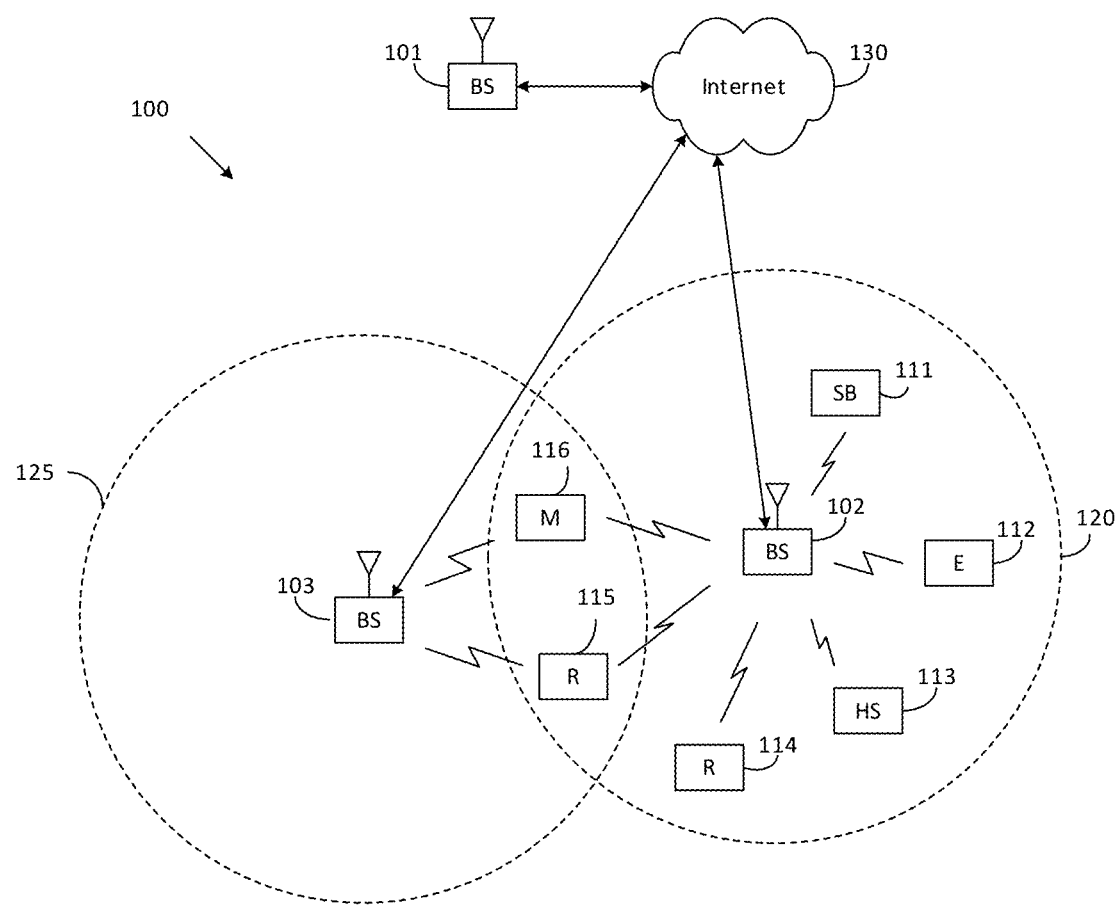
FIG. 1 illustrates an example wireless network according to embodiments of the present disclosure.
Figure 2:
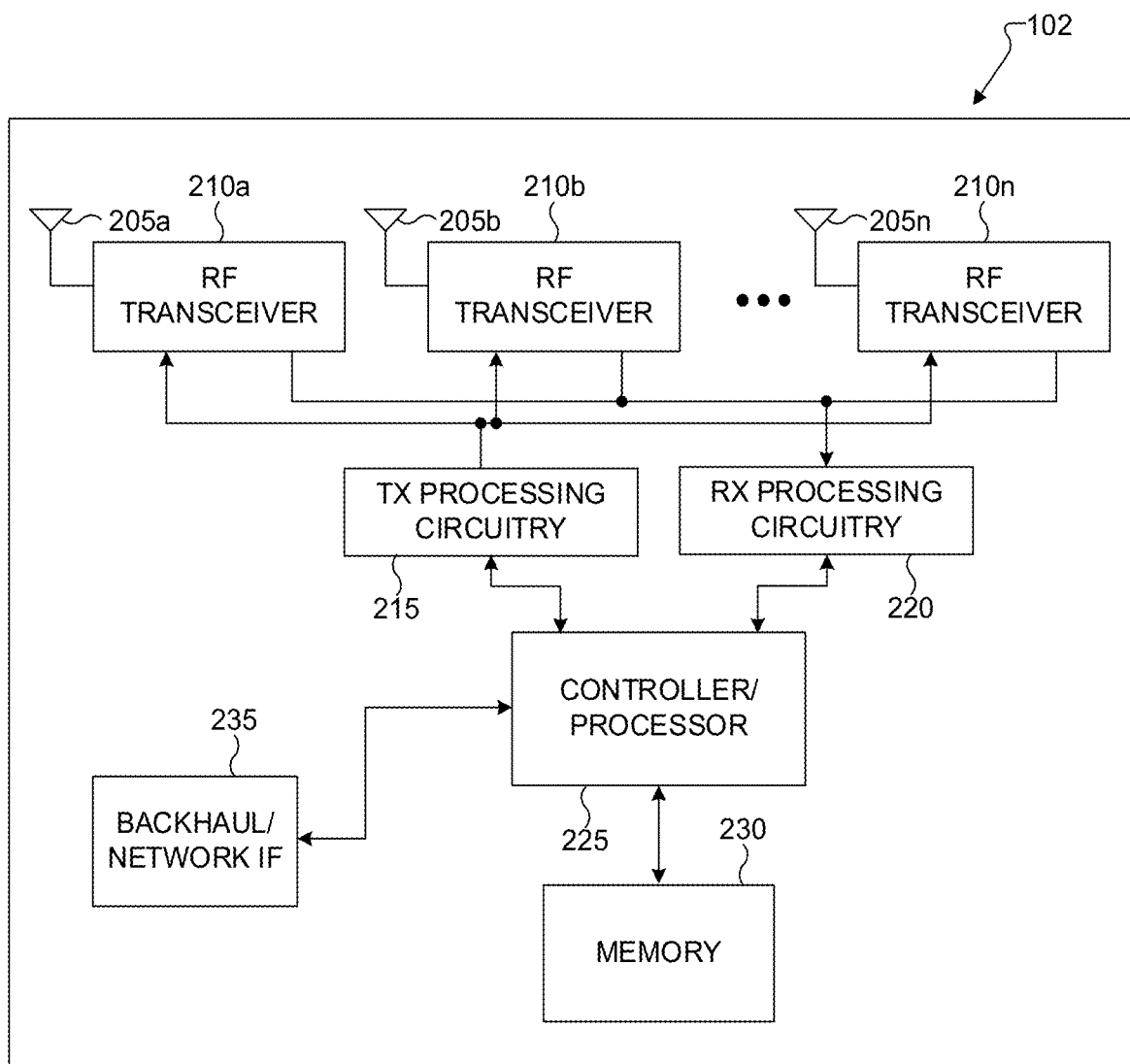
FIG. 2 illustrates an example gNB according to embodiments of the present disclosure.
Figure 3:
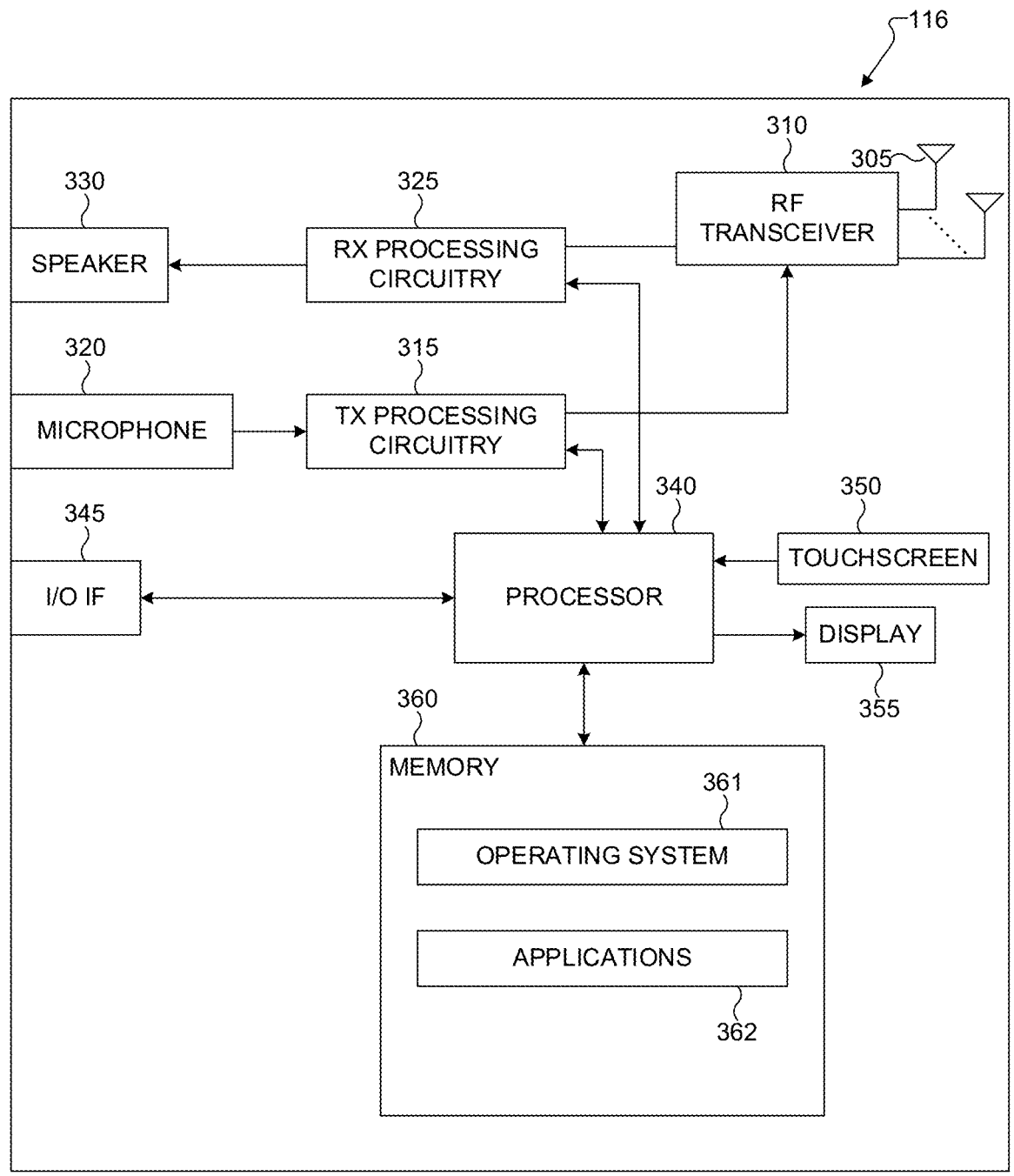
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary internet protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "B S" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CSI reporting on an uplink channel in an advanced wireless communication system. In certain embodiments, and one or more of the gNBs 101-103 includes circuitry, programming, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n are capable of transmitting PDCCHs that convey respective DCI formats, wherein each DCI format includes a counter field and a slot offset field, and transmitting PDSCHs that are configured by the DCI formats and convey data transport blocks, and receiving the HARQ-ACK codebook based on a value of the slot offset field and a value of the counter field in each transmitted DCI format at a time unit determined based on a value of the slot offset field in each transmitted DCI format.

In some embodiment, the RF transceivers 210a-210n are capable of transmitting first PDCCHs in first time instances and transmitting second PDCCHs in second time instances, and wherein a value of the slot offset field represents a same time unit in both first DCI formats conveyed by first PDCCHs and second DCI formats conveyed by second PDCCHs.

In some embodiment, the RF transceivers 210a-210n are capable of transmitting first PDCCHs in first time instances and transmitting second PDCCHs in second time instances, and wherein a value of the counter field in a DCI format conveyed by a first PDCCH or a second PDCCH indicates a single counter that is updated in both first DCI formats conveyed by first PDCCHs and second DCI formats conveyed by second PDCCHs.

In such embodiments, a DCI format configures a transmission of a number of PDSCHs and the value of the counter field is incremented by the number of PDSCHs.

In some embodiment, the RF transceivers 210a-210n are capable of transmitting first configuration information for a first number of HARQ processes for data transport blocks conveyed by PDSCH transmissions in a first cell and transmitting second configuration information for a second number of HARQ processes for data transport blocks conveyed by PDSCH transmissions in a second cell.

In some embodiment, the RF transceivers 210a-210n are capable of transmitting first PDCCHs in first time-frequency resources and transmitting second PDCCHs in second time-frequency resources, wherein second time resources are different than first time resources, and wherein a first time resource for a PDSCH transmission is located next to a last time resource of the first time-frequency resources in a subset of the first time-frequency resources and next to a last time resource of the second time-frequency resources in a subset of the second time-frequency resources.

In some embodiment, the RF transceivers 210a-210n are capable of transmitting first PDCCHs in first time-frequency resources that are located in first time instances and transmitting second PDCCHs in second time-frequency resources that are located in second time instances.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of determining locations for hybrid automatic repeat request acknowledgement (HARQ-ACK) bits in a HARQ-ACK codebook based on a value of the slot offset field and a value of the counter field in each transmitted DCI format and of determining a time unit for reception of the HARQ-ACK codebook based on a value of the slot offset field in each transmitted DCI format.

In such embodiments, a DCI format configures a transmission of a number of PDSCHs and the value of the counter field is incremented by the number of PDSCHs.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving PDCCHs that convey respective DCI formats, wherein each DCI format includes a counter field and a slot offset field and receiving PDSCHs that convey data transport blocks, determining locations for HARQ-ACK bits in a HARQ-ACK codebook based on a value of the slot offset field and a value of the counter field in each detected DCI format and determining a time unit for transmission of the HARQ-ACK codebook based on a value of the slot offset field in each detected DCI format, and transmitting the HARQ-ACK codebook based on the value of the slot offset field.

In some embodiments, the RF transceiver 310 is capable of receiving first PDCCHs in first time instances and receiving second PDCCHs in second time instances, and wherein a value of the slot offset field represents a same time unit in both first DCI formats conveyed by first PDCCHs and second DCI formats conveyed by second PDCCHs.

In some embodiments, the RF transceiver 310 is capable of receiving first PDCCHs in first time instances and receiving second PDCCHs in second time instances, and wherein a value of the counter field in a DCI format conveyed by a first PDCCH or a second PDCCH indicates a single counter that is updated in both first DCI formats conveyed by first PDCCHs and second DCI formats conveyed by second PDCCHs.

In such embodiments, a DCI format configures a reception of a number of PDSCHs and the value of the counter field is incremented by the number of PDSCHs.

In some embodiments, the RF transceiver 310 is capable of receiving first configuration information for a first number of HARQ processes for data transport blocks conveyed by PDSCH receptions in a first cell and receiving second configuration information for a second number of HARQ processes for data transport blocks conveyed by PDSCH receptions in a second cell.

In some embodiments, the RF transceiver 310 is capable of receiving first PDCCHs in first time-frequency resources and receiving second PDCCHs in second time-frequency resources, wherein second time resources are different than first time resources, and wherein a first time resource for a PDSCH reception is located next to a last time resource of the first time resources in a subset of the first time-frequency resources and next to a last time resource of the second time resources in a subset of the second time-frequency resources.

In some embodiments, the RF transceiver 310 is capable of receiving first PDCCHs in first time-frequency resources that are located in first time instances and receiving second PDCCHs in second time-frequency resources that are located in second time instances.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of detecting the DCI formats scheduling the received PDSCHs and determining locations for HARQ-ACK bits in a HARQ-ACK codebook based on a value of the slot offset field and a value of the counter field in each detected DCI format and determining a time unit for transmission of the HARQ-ACK codebook based on a value of the slot offset field in each detected DCI format.

In such embodiments, a DCI format configures a reception of a number of PDSCHs and the value of the counter field is incremented by the number of PDSCHs.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
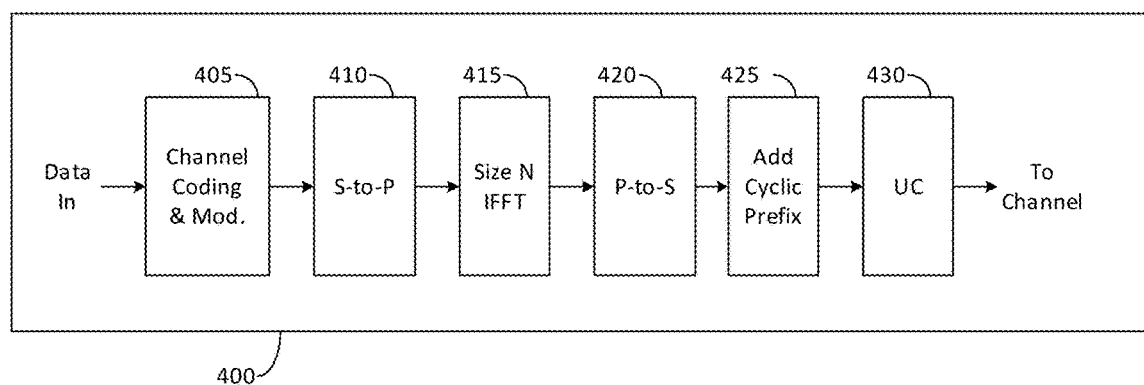
FIG. 4A illustrates a high-level diagram of an orthogonal frequency division multiple access transmit path according to embodiments of the present disclosure.
Figure 4B:
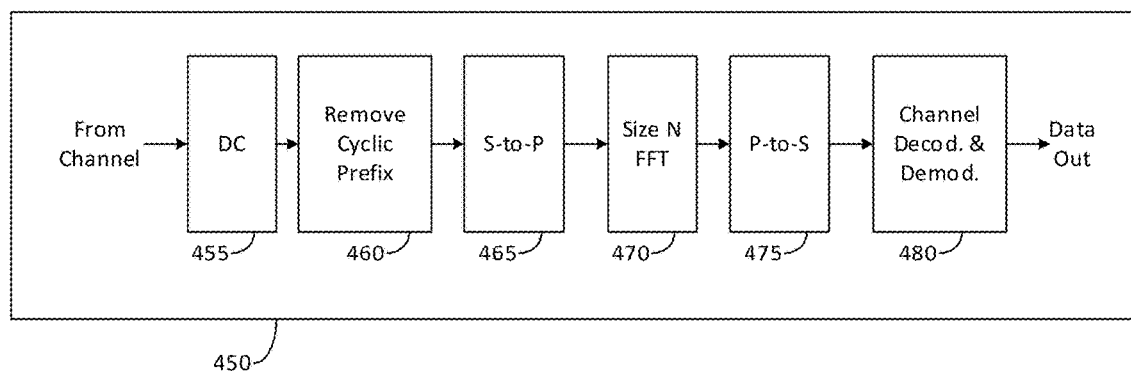
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an OFDMA communication. In FIGS. 4A and 4B, for downlink communication, the transmit path circuitry 400 may be implemented in a base station (e.g., gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, size N inverse fast Fourier transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size n fast Fourier transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of size N may be modified according to the implementation.

Furthermore, although this disclosure is directed to an embodiment that implements the fast Fourier transform and the inverse fast Fourier transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

DL transmissions or UL transmissions can be based on an OFDM waveform including a variant using DFT precoding that is known as DFT-spread-OFDM that is typically applicable to UL transmissions.

A reference time unit for DL signaling or for UL signaling on a cell is referred to as a slot and can include one or more slot symbols. A bandwidth (BW) unit is referred to as a resource block (RB). One RB includes a number of sub-carriers (SCs). For example, a slot can have duration of half millisecond or of one millisecond, include 7 symbols or 14 symbols, respectively, and a RB can have a BW of 180 KHz and include 12 SCs with inter-SC spacing of 15 KHz. A BW reception capability or a BW transmission for a UE can be smaller than a DL system BW or an UL system BW, respectively, and different UEs can be configured DL receptions or UL transmissions in different parts of a DL system BW or of an UL system BW, respectively, per slot.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including channel state information RS (CSI-RS) and demodulation RS (DMRS). A CSI-RS is intended for UEs to measure channel state information (CSI). A DMRS is typically transmitted only in the BW of a respective PDCCH or PDSCH and a UE can use the DMRS to demodulate DCI or data information. A DL DMRS or CSI-RS can be constructed by a Zadoff-Chu (ZC) sequence or a pseudo-noise (PN) sequence.

For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through higher layer signaling, such as radio resource control (RRC) signaling from a gNB Transmission instances and resources of a CSI-RS can be indicated by DL control signaling or configured by higher layer signaling A DMRS is transmitted only in the BW of a respective PDCCH or PDSCH and a UE can use the DMRS to demodulate data or control information.

Figure 5:
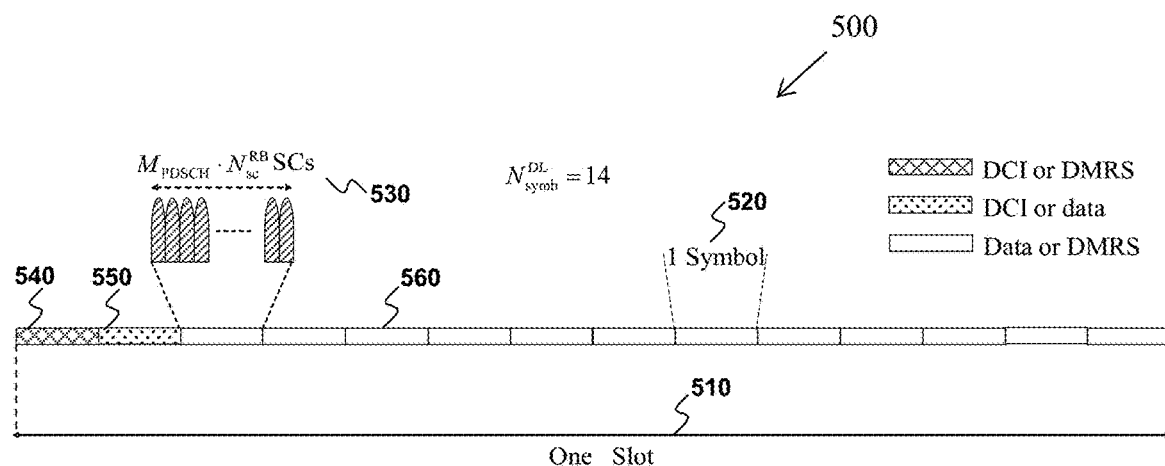
FIG. 5 illustrates an example DL slot structure for PDSCH transmission or PDCCH transmission according to embodiments of the present disclosure.

FIG. 5 illustrates an example DL slot structure 500 for transmission or PDCCH transmission according to embodiments of the present disclosure. An embodiment of the DL slot structure 500 for transmission or PDCCH transmission shown in FIG. 5 is for illustration only. Other embodiments may be used without departing from the scope of the present disclosure.

A slot 510 includes $N_{symb}^{DL}$ symbols 520 where a gNB transmits data information, DCI, or DMRS. A DL system BW includes $N_{RB}^{DL}$ RBs. Each RB includes $N_{sc}^{RB}$ SCs. For example, $N_{sc}^{RB}=12$. A UE is assigned $M_{PDSCH}$ RBs for a total of $M_{sc}^{PDSCH}=M_{PDSCH} \cdot N_{sc}^{RB}$ SCs 530 for a PDSCH transmission BW. A first slot symbol 540 can be used by the gNB to transmit DCI and DMRS. A second slot symbol 550 can be used by the gNB to transmit DCI, DMRS, or data information Remaining slot symbols 560 can be used by the gNB to transmit data information. DMRS, and possibly CSI-RS In some slots, the gNB can also transmit synchronization signals and system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI reports enabling a gNB to select appropriate parameters for PDSCH or PDCCH transmissions to a UE.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, a SRS transmission can also provide a PMI for DL transmission. Additionally, in order to establish synchronization or an initial RRC connection with a gNB, a UE can transmit a physical random access channel.

Figure 6:
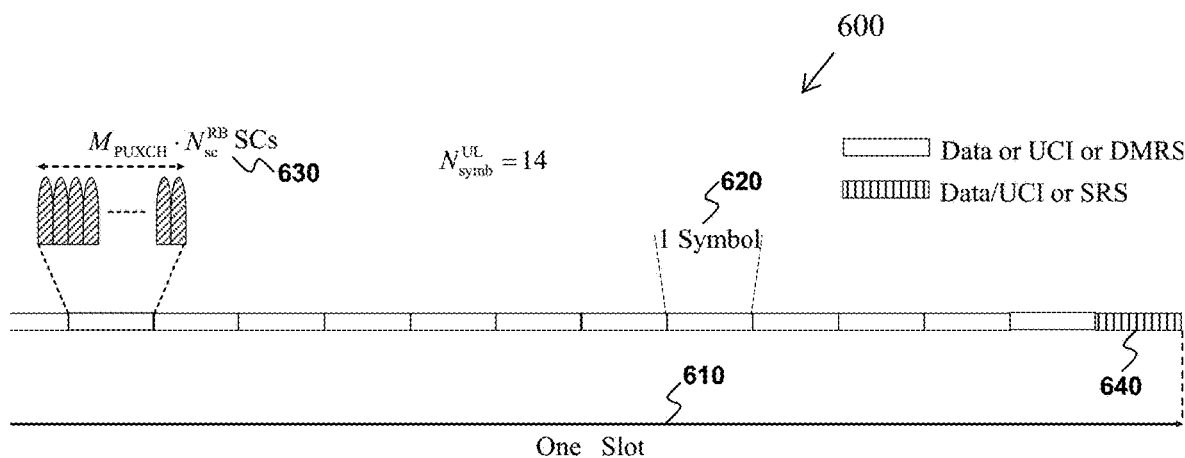
FIG. 6 illustrates an example UL slot structure for PUSCH transmission or PUCCH transmission according to embodiments of the present disclosure.

FIG. 6 illustrates an example UL slot structure 600 for PUSCH transmission or PUCCH transmission according to embodiments of the present disclosure. An embodiment of the UL slot structure 600 for PUSCH transmission or PUCCH transmission shown in FIG. 6 is for illustration only. Other embodiments may be used without departing from the scope of the present disclosure.

A slot 610 includes $N_{symb}^{UL}$ symbols 620 where a UE transmits data information, UCI, or RS including at least one symbol where the UE transmits DMRS 630. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH} = M_{PUXCH} \cdot N_{sc}^{RB}$ SCs 640 for a PUSCH transmission BW ("X"="S") or for a PUCCH transmission BW ("X"="C"). One or more last slot symbols can be used to multiplex SRS transmissions 650 (or PUCCH transmissions) from one or more UEs. A number of UL slot symbols available for data/UCI/DIVIRS transmission is $N_{symb}^{RUXCH} = 2 \cdot (N_{symb}^{UL} - 1) - N_{SRS}$. $N_{SRS} > 0$ when $N_{SRS}$ last slot symbols are used SRS transmissions (or PUCCH transmissions) from UEs that overlap at least partially in BW with a PUXCH transmission BW; otherwise, $N_{SRS} = 0$ Therefore, a number of total SCs for a PUXCH transmission is $M_{sc}^{PUXCH} \cdot N_{symb}^{PUXCH}$. PUCCH transmission and PUSCH transmission can also occur in a same slot; for example, a UE can transmit PUSCH in earlier slot symbols and PUCCH in later slot symbols.

A hybrid slot includes a DL transmission region, a guard period region, and an UL transmission region, similar to a special subframe in LTE. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

A PDCCH transmission can be over a number of control channel elements (CCEs). A UE typically performs multiple PDCCH decoding operations to detect DCI formats in a TTI. The UE determines locations of CCEs for a PDCCH reception (PDCCH candidate) according to a search space function for a corresponding CCE aggregation level. A DCI format includes cyclic redundancy check (CRC) bits in order for the UE to confirm a correct detection of the DCI format. A DCI format type is identified by a radio network temporary identifier (RNTI) that scrambles the CRC.

In the following, a DCI format scheduling a PDSCH transmission to a UE is referred to as DL DCI format or DL assignment while a DCI format scheduling a PUSCH transmission from a UE is referred to as UL DCI format or UL grant.

Figure 7:
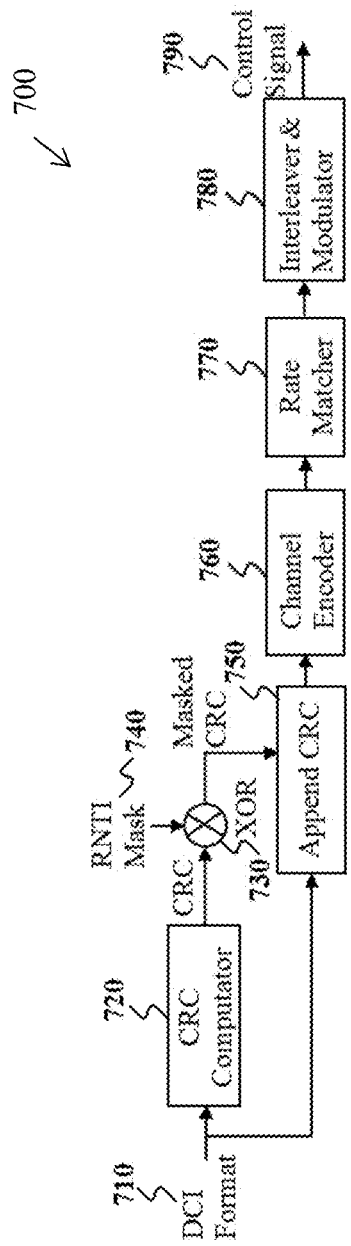
FIG. 7 illustrates an example encoding process for a DCI format according to embodiments of the present disclosure.

FIG. 7 illustrates an example encoding process 700 for a DCI format according to embodiments of the present disclosure. An embodiment of the encoding process 700 for a DCI format shown in FIG. 7 is for illustration only. Other embodiments may be used without departing from the scope of the present disclosure.

A gNB separately encodes, for example using a polar code or a tail-biting convolutional code (TBCC), and transmits each DCI format in a respective PDCCH. When applicable, a RNTI for a UE that a DCI format is intended for masks a CRC of the DCI format codeword in order to enable the UE to identify the DCI format. For example, the CRC and the RNTI can include 16 bits. Otherwise, when a RNTI is not included in a DCI format, a DCI format type indicator field can be included in the DCI format. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. An encoder 760 performs channel coding (such as tail-biting convolutional coding or polar coding), followed by rate matching to allocated resources by rate matcher 770. Interleaving and modulation units 780 apply interleaving and modulation, such as QPSK, and the output control signal 790 is transmitted.

Figure 8:
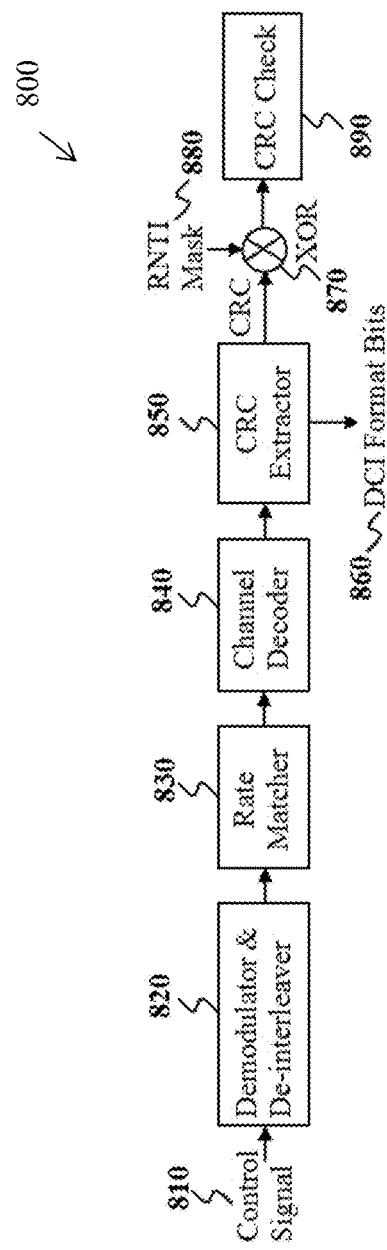
FIG. 8 illustrates an example decoding process for a DCI format for use with a UE according to embodiments of the present disclosure.

FIG. 8 illustrates an example decoding process 800 for a DCI format for use with a UE according to embodiments of the present disclosure. An embodiment of the decoding process 800 for a DCI format for use with a UE shown in FIG. 8 is for illustration only. Other embodiments may be used without departing from the scope of the present disclosure.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid. When the CRC check does not succeed, the DCI format information bits are considered to be invalid.

When a UE transmits UCI and data in a PUSCH, the UE can multiplex UCI and data. A PUSCH transmission can also convey only UCI without including any data transmission. A CSI request field in an UL DCI format triggering A-CSI transmission in a PUSCH can include a predefined number of bits, such as 2 bits or 3 bits. A mapping of the 2 bits can be as in Table 1.

TABLE 1

Mapping of CSI request field to CSI reports a UE provides in a PUSCH

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

UCI transmission in a PUCCH can be substantially over a slot or over a few symbols of a slot such as the last one or two symbols of a slot. UCI encoding methods can include repetition coding, Reed-Muller coding, polar coding, or TBCC. A UE can determine a HARQ-ACK codebook size either semi-statically based on a number of configured cells and a configured transmission mode for PDSCH transmission on each cell, or dynamically based on a counter DL assignment index (DAI) and a total DAI that can be included in a DL DCI format scheduling a PDSCH transmission.

For example, a counter DAI field or a total DAI field can include 2 bits and a respective value can be interpreted with an offset of 4 considering previous values when any. For example, counter DAI or total DAI binary values of 00, 01, 10, 11 can map to numeric values of 1, 2, 3, 4 and indicate, using the modulo 4 operation, a respective number of transmitted DCI formats as in LTE. For a FDD system, a value of a counter DAI field in a DL DCI format scheduling a PDSCH transmission in a slot on a cell indicates a number of DL DCI formats scheduling PDSCH transmissions in the slot across all cells with indexes smaller than or equal to the cell index. A value of a total DAI field in a DL DCI format scheduling a PDSCH transmission in a slot on a cell indicates a number of DL DCI formats scheduling PDSCH transmissions across all configured cells in the slot. For a TDD system, a value of a counter DAI field in a DL DCI format scheduling a PDSCH transmission in a slot on a cell indicates a number of DL DCI formats scheduling PDSCH transmissions across all configured cells in previous slots, when any, associated with a same slot for HARQ-ACK transmission as the slot and across all cells with indexes smaller than or equal to the cell index in the slot. A value of a total DAI field in a DL DCI format scheduling a PDSCH transmission in a slot on a cell indicates a number of DL DCI formats scheduling PDSCH transmissions across all configured cells and in all slots up to the slot that are associated with a same slot for HARQ-ACK transmission.

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. By maintaining an RRC connection to the macro-cell, communication with the small cell can be optimized as control-place (C-place) functionalities such as mobility management, paging, and system information updates can be provided only by the macro-cell while a small-cell can be dedicated for user-data plane (U-plane) communications. If a latency of a backhaul link between network nodes (cells) is practically zero, carrier aggregation (CA) can be used and scheduling decisions can be made by a central entity and conveyed to each network node. Moreover, UCI from a UE can be received at any network node, except possibly for nodes using unlicensed spectrum, and conveyed to the central entity to facilitate a proper scheduling decision for the UE.

A CA operation can typically support a number of cells each with a maximum of 20 MHz BW. In many application of interest, a 20 MHz maximum BW value for a carrier is too small and is associated with a several disadvantages. For example, for unlicensed spectrum in the 5.8 GHz band, there is more than 200 MHz of available contiguous BW, for the 3.5 GHz C-band, there is more than 400 MHz of contiguous available spectrum, while for millimeter wave bands there are several GHz of contiguous available spectrum. Having separate carriers of 20 MHz BW each over an available contiguous BW of several hundred MHz requires having respective separate guard bands each with size of about 10% of the carrier BW thereby leading to substantial (10%) resource waste.

It is therefore preferable for a so-called 5G system to operate with a single carrier of larger size, such as 80 MHz or 160 MHz, than with several carriers of smaller size such as 20 MHz. The limitation in a size of a carrier BW is primarily determined by a sampling rate for digital processing as a larger carrier BW requires a higher sampling rate. To enable different UEs with different reception BW capabilities to be scheduled for PDSCH transmissions during a same slot, a design should support multiplexing over a system BW of PDCCH transmissions to UEs with different BW reception capabilities.

One other characteristic of so-called 5G systems is that transmission duration can depend on a service type. For example, for services that can benefit from low latency the transmission duration can be 0.5 msec or smaller while for latency-tolerant services an overhead associated with packet headers can be minimized by transmitting larger data TBs over longer transmission duration such as 1 msec or longer. Further, the transmission duration can be variable, ranging from only one slot symbol, to all symbols in a slot, to multiple slots.

Different services can also require different reliability requirements; for example, ultra-reliable services can require a block error rate (BLER) of 0.001% while typical mobile broadband services can require a BLER of 1%.

A PUSCH transmission power from a UE is set with an objective to achieve a reliability target for associated data by achieving a respective target received SINR at a serving cell of a gNB while controlling interference to neighboring cells. UL power control (PC) includes open-loop PC (OLPC) with cell-specific and UE-specific parameters and closed-loop PC (CLPC) corrections provided to a UE by a gNB through transmission PC (TPC) commands. When a PUSCH transmission is scheduled by a PDCCH, a TPC command is included in a respective UL DCI format.

A UE can derive a PUSCH transmission power $P_{PUSCH,c}$ (i), in decibels per milliwatt (dBm), in cell C and slot i as shown in Equation (1). For simplicity, it is assumed that the UE does not transmit both PUSCH and PUCCH in a same slot. Equation (1) given by:

$$P_{PUSCH,c}(i) = \min\begin{Bmatrix} P_{CMAX,c}(i), \\ 10\log_{10}(M_{PUSCH,c}(i)) + \\ P_{O\_PUSCH,c}(j) + a_c(j) + \\ \alpha_c(j) \cdot PL_c + \Delta_{TF,c}(i) + f_c(i) \end{Bmatrix}[dBm] \quad \text{Equation (1)}$$

where, $P_{CMAX,c}^{(i)}$ is a maximum UE transmission power in cell c and slot i; $M_{PUSCH,c}^{(i)}$ PUSCH transmission BW in RBs in cell c and slot i; $P_{O\_PUSCH,c}$ (j) controls a mean received SINR at the gNB in cell c and is the sum of a cell-specific component $P_{O\_NOMINAL\_PUSCH,c}$ (j) and a UE-specific component $P_{O\_UE\_PUSCH,c}$ (j) provided to the UE by the gNB through higher layer signaling. For semi-persistently scheduled (SPS) PUSCH (re)transmissions, j=0. For dynamically scheduled PUSCH (re)transmissions, j=1; $PL_c$ is a path loss (PL) estimate computed by the UE for cell c; For j=0 or j=1, $\pi_c(j) \in \{0, 0.4, 0.5, 0.6, 0.7, 0.8, 0.9, 1\}$ is configured to the UE by the gNB through higher layer signaling. Fractional UL PC is obtained for $\alpha_c$ (j)<1 as a PL is not fully compensated; $\Delta_{TF,c}(i)$ is either equal to 0 or is determined by a spectral efficiency of a PUSCH transmission as $\Delta_{TF,c}(i) = 10 \log_{10}((2^{BPRE \cdot K_s} - 1) \cdot \beta_{offset}^{PUSCH})$ where, $K_S$ is configured to a UE by higher layer signaling as either $K_S=0$ or $K_S=1.25$ and $BPRE=O_{CQI}/N_{RE}$ for A-CSI sent via PUSCH without UL-SCH data and $$\sum_{r=0}^{C-1} K_r/N_{RE}$$

for other cases, where C is the number of code blocks, K, is the size for code block r, $O_{CAI}$ is the number of CQI/PMI bits including CRC bits and $N_{RE}$ is the number of REs determined as $N_{RE}=M_{sc}^{PUSCH\text{-}initial} \cdot N_{symb}^{PUSCH\text{-}initial}$, where C, K, $M_{sc}^{PUSCH\text{-}initial}$ and $N_{symb}^{PUSCH\text{-}initial}$, and $\beta_{offset}^{PUSCH}=\beta_{offset}^{CQI}$ for A-CSI sent via PUSCH without UL-SCH data and 1 for other cases; and $f_c(i)=f_c(i-1)+\delta_{PUSCH,c}(i-K_{PUSCH})$ if accumulative CLPC is used, and $f_c(i)=\delta_{PUSCH,c}(i-K_{PUSCH})$ if absolute CLPC is used where $\delta_{PUSCH,c}(i-K_{PUSCH})$ is a TPC command included in an UL DCI format scheduling a PUSCH or included in a DCI format 3/3A. $K_{PUSCH}$ is derived from a timeline between a slot of a PDCCH transmission scheduling a PUSCH and a slot of a respective PUSCH transmission.

A PUCCH transmission power $P_{PUCCH,c}(i)$ from a UE in cell C and slot i is given by Equation 2:

Equation 2

$$P_{PUCCH,c}(i) = \min\left\{ \begin{array}{l} P_{CMAX,c}(i), \\ P_{0\_PUCCH,c} + PL_c + h(n_{CQI}, n_{HARQ}, n_{SR}) + \Delta_{F\_PUCCH}(F) + \Delta_{TxD}(F') + g(i) \end{array} \right\}[dBm]$$

where $P_{CMAX,c}(i)$ is a maximum UE transmission power in cell C and slot i; $P_{0\_PUCCH,c}$ is a sum of a cell-specific parameter $P_{0\_NOMINAL\_PUCCH,c}$ and a UE-specific parameter $P_{0\_UE\_PUCCH,c}$ that are provided to a UE by higher layer signaling; $PL_c$ is a path loss (PL) estimate computed by the UE for cell c; h(•) is a function with values depending on a format used for the PUCCH transmission and on whether HARQ-ACK, SR, or CSI is transmitted; $\Delta_{F\_PUCCH}$ (F) is provided to the UE by higher layers and its value depends on a respective PUCCH format (F); $\Delta_{TxD}$(F') is non-zero if a PUCCH format F' is transmitted from two antenna ports; and $g(i)=g(i-1)+\delta_{PUCCH}(i)$ is a function accumulating a TPC command $\delta_{PUCCH}(i)$ in a DCI Format 3/3A or in a DL DCI format and g(0) is a value after reset of accumulation.

A SRS transmission power can be determined in association with a PUSCH transmission power while a PRACH transmission power can be determined by a combination of path-loss measurements from a UE and a power ramping process, for example for contention-based transmission, or based using TPC commands in case the PRACH transmission is triggered by a PDCCH order. For brevity, a description is omitted.

The present disclosure considers that, for CA operation, a UE can be configured to transmit or receive on first one or more cells using a first numerology or a first transmission duration and on second one or more cells using a second numerology or second transmission duration. Also, the first one or more cells can use a first radio access technology, such as LTE, while the second one or more cells can use a second radio access technology such as 5G.

Therefore, there is a need to enable multiplexing for PDCCH transmissions over a system BW to UEs with different BW reception capabilities. There is another need to enable CA operation among carriers that support control or data transmissions over different durations. There is another need to determine an HARQ-ACK codebook for CA operation among cells with different durations for respective PDSCH transmissions. There is a another need to support simultaneous transmissions from a UE on first one or more cells using a first duration and on second one or more cells using a second duration. There is another need to design a transmission power control process for overlapping transmissions from a UE on first one or more cells using a first duration and on second one or more cells using a second duration. There is another need to define prioritization mechanisms for power allocation from a UE to various signaling types with overlapping transmissions on first one or more cells using a first duration and on second one or more cells using a second duration. Finally, there is a need to define a power allocation method for a UE when the UE needs to simultaneously support multiple traffic services having different reception reliability requirements.

In some embodiments, a configuration for PDCCH transmissions on a carrier to UEs with different BW reception capabilities is provided. Although two UE categories are considered for brevity, the embodiment can be directly extended to a larger number of UE categories. Transmissions to UEs from each of the two UE categories are considered to use a same numerology such as a same SC spacing, a same OFDM symbol duration, and so on.

A first UE is of a first UE category and is capable of receiving over a first BW such as 80 MHz or 160 MHz while a second UE is of a second LTE category and is capable of receiving over a second BW, smaller than the first BW, such as 20 MHz. For simplicity, it is considered that a BW of a carrier is same as the first BW. For PDCCH transmissions, the first BW is partitioned into two parts, a first BW part that corresponds to the first BW excluding the second BW and a second BW part that corresponds to the second BW. The first UE can be informed of the BW partitioning through UE-common or UE-specific higher layer signaling from a gNB. UE-common signaling, informing of a BW partitioning, can also be provided by a PDCCH transmission using a UE-common RNTI. When UWs of the second category are not served by the gNB, the gNB can avoid configuring the BW partitioning.

In one example, PDCCH transmissions to the first UE are in the first BW part and PDCCH transmissions to the second LTE are in the second BW part. Although the first UE can be scheduled to receive PDSCH transmissions over the first BW or receive other signaling such as CSI-RS over the first BW, the first UE can be configured to receive PDCCH only over the first BW part of the first BW, that is, only over the first BW that excludes the second BW. In such example, the first BW part forms a virtual system BW for PDCCH transmissions that is smaller than the first BW that is available for PDSCH transmissions to the first UE. In general, the second BW part can be in any part of the first BW. In order to avoid duplication of transmissions of some signaling, such as broadcast control signaling or synchronization signaling, the second BW can include the BW of the aforementioned signaling. The second UE can receive both PDCCH transmissions and PDSCH transmissions in the second BW part or can retune and receive PDCCH transmissions or PDSCH transmissions in another BW part of the first BW that is equal to the second BW part.

Figure 9:
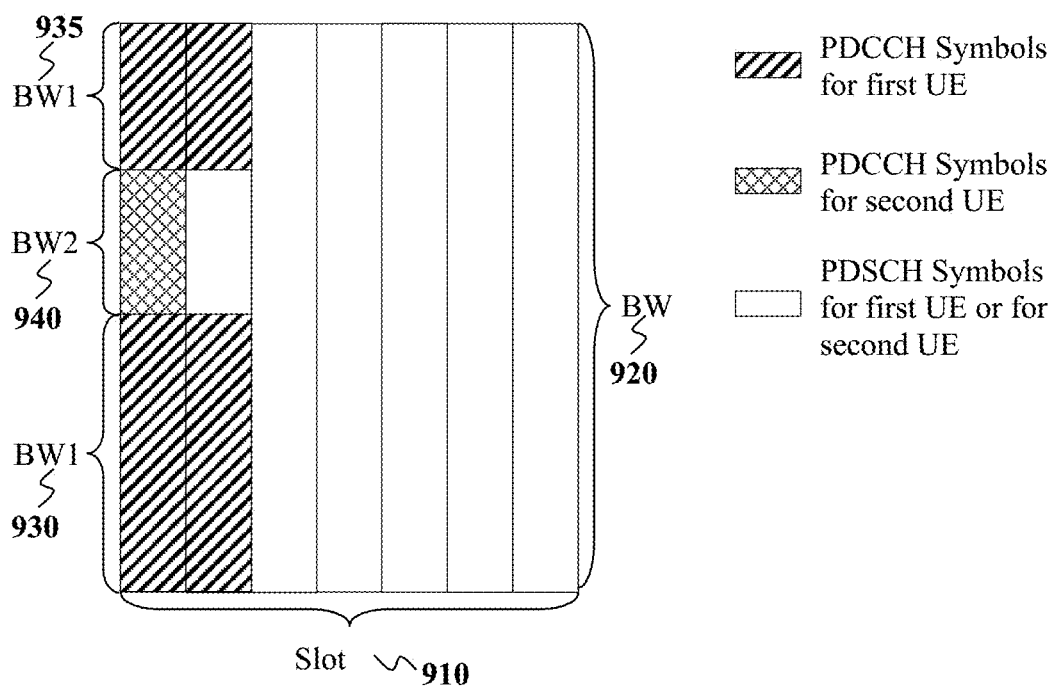
FIG. 9 illustrates an example partitioning of a first BW to a first BW part for PDCCH transmissions to a first UE of a first UE category and to a second BW part for PDCCH transmissions to a second UE of a second UE category according to embodiments of the present disclosure.

FIG. 9 illustrates an example partitioning 900 of a first BW to a first BW part for PDCCH transmissions to a first UE of a first UE category and to a second BW part for PDCCH transmissions to a second. UE of a second LT category according to embodiments of the present disclosure. An embodiment of the partitioning 900 of a first BW to a first BW part for PDCCH transmissions to a first UE of a first UE category and to a second BW part for PDCCH transmissions to a second UE of a second UE category shown in FIG. 9 is for illustration only. Other embodiments may be used without departing from the scope of the present disclosure.

A slot for PDCCH transmissions and for PDSCH transmissions includes 7 OFDM symbols (7 slot symbols) 910. A system BW 920 is partitioned into a first BW part 930, 935 and a second BW part 940. PDCCH transmissions to a first UE of a first UE category can be configured to be over only the first BW part of a carrier BW and over a first number of OFDM symbols (2 OFDM symbols) while PDSCH transmissions can be over the carrier BW, Both PDCCH transmissions and PDSCH transmissions to a second UE of a second LTE category can be over only the second BW part of the carrier BW and over a second number of OFDM symbols (1 OFDM symbol). A number of symbols in the slot used for PDCCH transmissions to a first UE can be different than a number of symbols in the slot used for PDCCH transmission to the second UE. Each of the two numbers of symbols can be indicated by respective DCI formats that are decoded by the first UE and by the second UE, respectively, in order to determine a first symbol of a PDSCH transmission or for a PUSCH transmission.

In another example, the carrier BW (considered to be same as a first BW) is not explicitly partitioned for PDCCH transmissions. Instead, to enable multiplexing of PDCCH transmissions to the first UE over the first BW and to the second UE over the second BW, CCEs used for a PDCCH transmission to the first UE are located either in the second BW (second BW part) or in the first BW part (first BW excluding the second BW) according to a respective search space that considers PDCCH transmission over a BW equal either to the first BW part or to the second BW part. Therefore, the first UE can be configured a first BW part and a first number of symbols for first PDCCH receptions and a second BW part and a second number of symbols for second PDCCH receptions.

The first UE can have a first number of PDCCH candidates for a CCE aggregation level for PDCCH transmissions in the first BW part of the carrier (or cell) and the first number of symbols and a second number of PDCCH candidates for the CCE aggregation level for PDCCH transmissions in the second BW part of the carrier (or cell) and the second number of symbols. Each number of candidates can be configured to the first HE by a gNB through higher layer signaling. Therefore, the first UE can attempt PDCCH decoding according to two search spaces; a first search space over the first BW excluding the second BW and a second search space over the second BW. When there are no PDCCH candidates configured for PDCCH transmissions in the second. BW part of the carrier, the PDCCH transmissions to the first UE is as in FIG. 9 and the system BW is implicitly partitioned for PDCCH transmissions.

Figure 10:
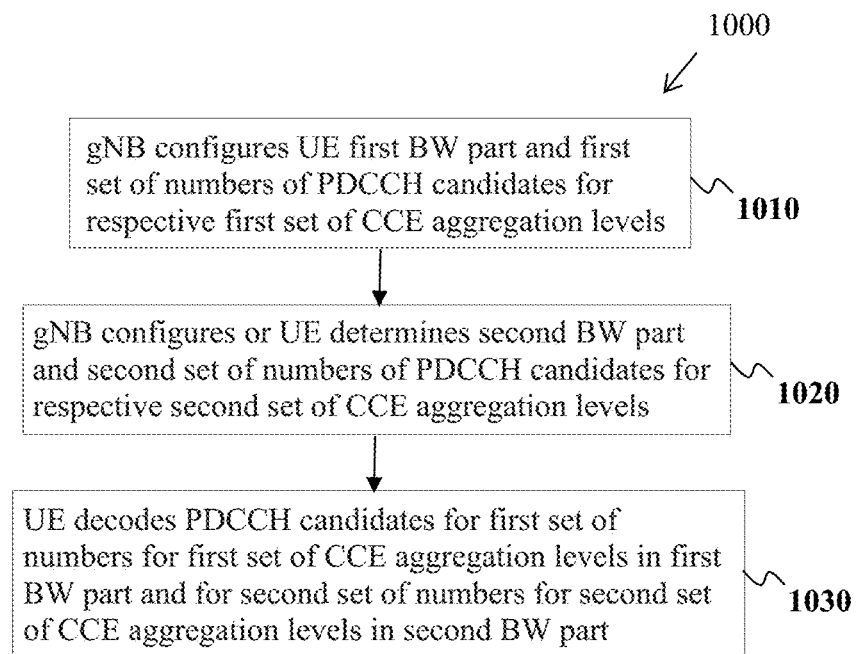
FIG. 10 illustrates an example process for allocating from a gNB to a UE a number of PDCCH candidates in a first BW part over a first number of symbols and in a second BW part of a system BW over a second number of symbols according to embodiments of the present disclosure.

FIG. 10 illustrates an example process 1000 for allocating from a gNB to a UE a number of PDCCH candidates in a first BW part over a first number of symbols and in a second BW part of a system BW over a second number of symbols according to embodiments of the present disclosure. An embodiment of the process 1000 for allocating from a gNB to a UE a number of PDCCH candidates in a first BW part over a first number of symbols and in a second BW part of a system BW over a second number of symbols shown in FIG. 10 is for illustration only. Other embodiments may be used without departing from the scope of the present disclosure.

A transmission point, such as a gNB in step 1010, configures a UE with a first BW part of a system BW on a carrier over a first number of symbols and with a first set of numbers of PDCCH candidates for a respective first set of CCE aggregation levels for PDCCH transmission in the first BW part over the first number of symbols. Based on the system BW and the first BW part, the UE determines a second BW part as the system BW excluding the first BW part. Based on a set of predetermined total numbers of PDCCH candidates for a respective set of CCE aggregation level and on the configured first set of numbers of PDCCH candidates for the respective first set of CCE aggregation levels, the UE determines, in step 1020, a second set of numbers of candidates for a respective second set of CCE aggregation levels for PDCCH transmission in the second BW part on the carrier over a second number of symbols.

It is also possible that the step 1010 is relative to the second BW part and the step 1020 is relative to the first BW part. It is also possible that the gNB configures the UE both the first BW part and the first number of symbols and the second BW part and the second number of symbols, for example to enable existence of additional BW parts that the LTE does not need to be informed of, and the number of PDCCH candidates per CCE aggregation level for each BW part. The first set of CCE aggregation levels can be same as the second set of CCE aggregation levels and predetermined in the system operation. In step 1030, the HE decodes PDCCH candidates according to the first set for number of candidates for the respective first set of CCE aggregation levels in the first BW part over the first number of symbols and decodes PDCCH candidates according to the second set for number of candidates for the respective second set of CCE aggregation levels in the second BW part over the second number of symbols as in FIG. 9.

The configuration of the first BW part and the first number of symbols to a HE of the first category can also be time varying and depend on a slot number in a set of slots. For example, in a first subset of slots from the set of slots, PDCCH transmission to the first UE can be in the first BW part of the carrier BW and the first number of symbols while in a second subset of slots from the set of slots, PDCCH transmission to the first LTE can be in the first BW (same as the carrier BW) and be located either in the first BW part and the first number of symbols or in the second BW part and the second number of symbols. The first subset of slots and the second subset of slots can be configured to a HE by a gNB by higher layer signaling such as for example a bitmap. For example, this can allow multiplexing of different numerologies in a TDM manner and a UE can have all PDCCH candidates over a first BW that excludes a second BW part during slots where the second BW part is indicated as being unavailable for PDCCH transmissions to the UE, As previously mentioned, whether a BW partitioning applies in a slot can alternatively be indicated by a PDCCH that uses a HE-common RNTI to scramble a CRC of an associated DCI format. Therefore, a HE can receive PDCCH transmissions in a first BW part over a first number of symbols in a first subset of slots from a set of slots and receive PDCCH transmissions in the first BW part over the first number of symbols and in a second BW part over a second number of symbols in a second subset of slots from a set of slots.

Configuration of BW parts of a carrier BW either as BW parts that are excluded from PDCCH transmissions or as BW parts where PDCCH transmissions occur (and the rest of the carrier BW is excluded from PDCCH transmissions) can also be beneficial for frequency-domain inter-cell interference coordination (ICIC). For example, a gNB can use a first set of BW parts of a carrier BW over a respective first set of numbers of symbols to transmit PDCCHs in a first cell and use a second set of BW parts over a respective second set of numbers of symbols of a carrier BW to transmit PDCCHs in a second cell where the first set and the second set can have non-common elements in order to suppress or completely avoid interference among PDCCH transmission on the two cells. Therefore, the configuration of BW parts of a carrier BW for the purpose of PDCCH transmissions can also be applicable when a single category of UEs communicates with a gNB.

In some embodiments, HARQ-ACK transmission from a UE configured for DL CA operation is provided when PDSCH transmission duration is same for all cells, and when at least two groups of one or more cells use different durations for PDSCH transmissions. In one example, the UE is configured for DL CA operation where PDSCH transmissions in all cells have same transmission duration. The first scenario also includes the case of no CA operation (number of configured cells is one). In another example, the UE is configured for DL CA operation where transmissions in a first group of cells have a first duration and PDSCH transmissions in a second group of cells have a second duration and the first duration is an integer multiple of the second duration.

A DL DCI format scheduling a PDSCH transmission to a UE includes a field indicating a slot offset, relative to a slot of the PDSCH transmission, for a UE to transmit HARQ-ACK information in response to a reception of data TBs conveyed by the PDSCH. The DL DCI format can also include a field to indicate a resource for a. PUCCH that conveys the HARQ-ACK information. The exact PUCCH structure is not material to the disclosure and it can be same as one for PUCCH formats used for DL CA operation or a different structure with transmission over a few symbols at the end of a slot can apply.

A DL DCI format scheduling a PDSCH transmission to a UE on a cell can include a counter DAI field, a total DAI field, and a slot offset field for transmission of HARQ-ACK information in response to a correct or incorrect detection of data TBs conveyed by a respective PDSCH. For a PDSCH transmitted to a UE in slot n, a slot offset $k_1$ indicates to the UE to transmit respective HARQ-ACK information in slot $n+k_1$ when $k_1$ is defined relative to n, or in slot $n+k_1+k_0$ when $k_1$ is defined relative to $k_0$ where $k_0$ is a predetermined value, for example based on a UE category, or a configured value and is equal to a number of slots between a slot when a UE receives a PDSCH and an earliest next slot when the UE can transmit associated HARQ-ACK information. The UE can receive the PDSCH in the entire slot n, or in a part of slot n, or the UE can receive multiple PDSCHs in slot n.

For example, when a UE requires at least 2 slots to transmit HARQ-ACK information in response to a PDSCH reception, $k_0=2$. The UE can inform a serving gNB of a $k_0$ value relative to reference slot duration either explicitly though higher layer signaling or implicitly through signaling of the UE category. Therefore, a counter DAI value and a total DAI value are incremented for a number of slots that depends on the value of $k_1$ and the value of $k_1$ defines a set of slots that a UE transmits associated HARQ-ACK information, for example in a PUCCH, in symbols of a same slot. This is applicable for either FDD or TDD operation.

A UE can discard a DL DCI format scheduling a PDSCH transmission on a cell in a slot when a $k_1$ value of a slot offset field is not consistent with other $k_1$ values in DL DCI formats the UE detected in previous slots that belong to a same slot set. For example, when a UE detects first DL DCI formats scheduling respective first PDSCH transmissions on cells in a slot and having a first value of $k_1$ that is larger than zero and the UE detects second DL DCI formats scheduling respective second PDSCH transmissions on cells in a next slot and having a second value of $k_1$ where in one of the second DL DCI formats the second value of $k_1$ is smaller by more than one relative to the first value of $k_1$, the UE can disregard the one of the second DL DCI formats.

A same validation can apply when DL DCI formats associated with a same set of slots indicate a PUCCH resource for HARQ-ACK transmission in a slot and a UE can disregard a DL DCI format indicating a PUCCH resource that is different than a PUCCH resource indicated in the remaining of the DL DCI formats. For example, when a UE is configured for CA operation and the UE detects DL DCI formats scheduling respective PDSCH in a same slot on different cells and one of the DL DCI formats indicates a different PUCCH resource for transmission of associated HARQ-ACK information, the UE can disregard the one of the DL DCI formats. The counter DAI and the total DAI operation can be as for a TDD system in LTE regardless of whether or not the communication system operates in FDD mode or in TDD mode.

Figure 11:
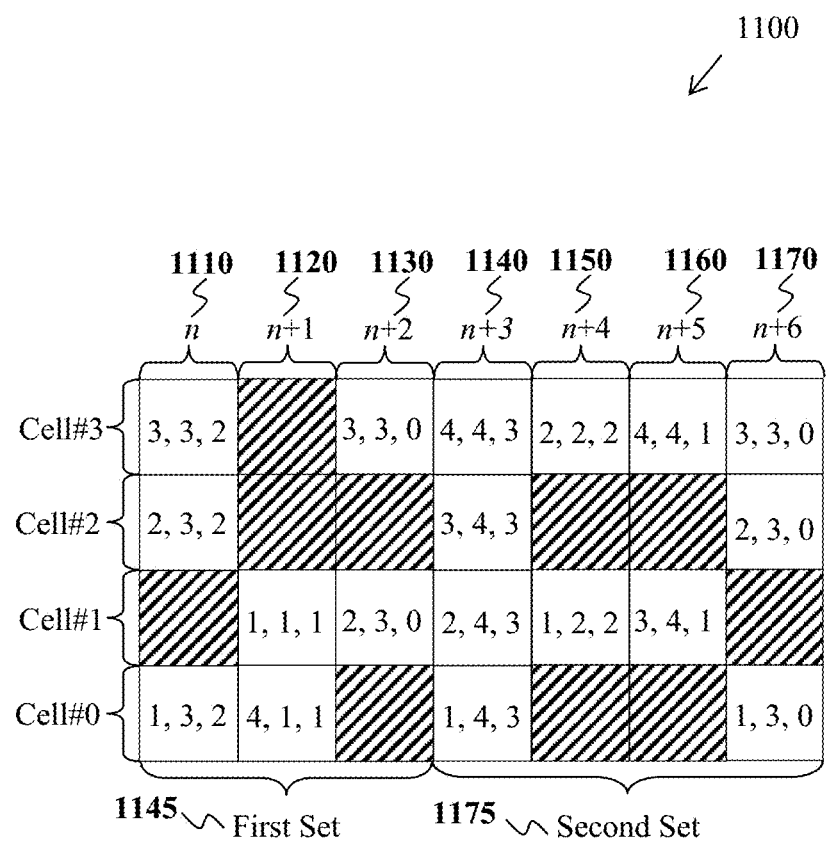
FIG. 11 illustrates an example process for an operation of a counter DAI field, a total DAI field, and a HARQ-ACK transmission slot offset field in DCI formats scheduling PDSCH transmissions with same duration of one slot on respective cells according to embodiments of the present disclosure.

FIG. 11 illustrates an example process 1100 for an operation of a counter DAI field, a total DAI field, and a HARQ-ACK transmission slot offset field in DL DCI formats scheduling PDSCH transmissions with same duration of one slot on respective cells according to embodiments of the present disclosure. An embodiment of the process 1100 for an operation of a counter DAI field, a total DAI field, and a HARQ-ACK transmission slot offset field in DL DCI formats scheduling PDSCH transmissions with same duration of one slot on respective cells shown in FIG. 11 is for illustration only. Other embodiments may be used without departing from the scope of the present disclosure.

A DL DCI format scheduling a PDSCH transmission in a slot on cell c includes a counter DAI field With value $V_{C\text{-}DAI,c}^{DL}$, a total DAI with value $D_{T\text{-}DAI}^{DL}$, and a slot offset with value kn. In a first slot 1110, there are three scheduled PDSCH transmissions to a UE and triplets of values ($V_{C\text{-}DAI,c}^{DL}$, $V_{T\text{-}DAI}^{DL}$, $k_1$) in associated DL DCI formats are (1, 3, 2), (2, 3, 2), and (3, 3, 2) starting from a cell with a lowest index among cells with PDSCH transmissions in the first slot. In a second slot 1120, there are two scheduled PDSCH transmissions to the UE and triplets of values ($V_{C\text{-}DAI,c}^{DL}$, $V_{T\text{-}DAI}^{DL}$, $k_1$) in associated DL DCI formats are (4, 1, 1) and (1, 1, 1). In a third slot 1130, there are two scheduled PDSCH transmissions to the UE and triplets of values ($V_{C\text{-}DAI,c}^{DL}$, $V_{T\text{-}DAI}^{DL}$, $k_1$) in associated DL DCI formats are (2, 3, 0) and (3, 3, 0). Based on the $k_1$ value in any of the DL DCI formats, the UE determines that the third slot is the last slot from the three slots defining a first set of slots 1135 where the UE transmits HARQ-ACK information in a same slot. The triplet of values (($V_{C\text{-}DAI,c}^{DL}$, $V_{T\text{-}DAI}^{DL}$, $k_1$) in associated DL DCI formats is reset in a DL DCI format scheduling PDSCH on a cell with a lowest index in a fourth slot 1140 and a similar operation as in the first set of slots applies for a second set of slots. Based on the $k_1$ value in any of the DL DCI formats the UE detects in slot n+3, or n+4, or n+5, or n+6, the UE determines that slots 1140, 1150, 1160, and 1170 form the second set of slots 1175 and assumes that the triplet of values ($V_{C\text{-}DAI,c}^{DL}$, $V_{T\text{-}DAI}^{DL}$, $k_1$) is reset after slot n+6.

The descriptions in FIG. 11 consider a 'slot' as the minimum time unit for PDSCH transmissions. Nevertheless, the same descriptions apply for any other duration of the minimum e unit such as a slot symbol or a number of slot symbols. Additionally, different PDSCH transmissions can have different durations.

In general, a minimum time interval for updating a total DAI value for a UE (when there is a PDCCH transmission to the UE conveying a DL DCI format), is a number of slot symbols (or slots) between successive PDCCH receptions in a same or different BW part and number of symbols. For example, when a UE is configured to receive PDCCH transmissions in a BW part over a number of symbols (tune-frequency resources for PDCCH receptions) once every $I_{PDCCH}^{monitor}$ symbols (PDCCH monitoring period), a total DAI value can be updated every $I_{PDCCH}^{monitor}$ symbols (per PDCCH monitoring period). For example, when a UE is configured to receive PDCCH transmissions in a first BW pail over a first number of symbols once every $I_{PDCCH}^{monitor,1}$ symbols ($I_{PDCCH}^{monitor,1}$ is a first PDCCH monitoring period in first time-frequency resources) and is also configured to receive PDCCH transmissions in a second BW part over a second number of symbols per $I_{PDCCH}^{monitor,2}$ symbols ($I_{PDCCH}^{monitor,2}$ is a second PDCCH monitoring period in second time-frequency resources), a total DAI value can be updated on every period of $I_{PDCCH}^{monitor,1}$ symbols or $I_{PDCCH}^{monitor,2}$ symbols. In general, a UE can be configured to receive PDCCHs in first time-frequency resources at first time instances and to receive PDCCHs in second time-frequency resources at second time instances.

For simultaneous occurrence of the first time-frequency resources and the second time-frequency resources for PDCCH receptions by a UE, a total DAI value can updated to a same value in a first DL DCI format conveyed by a first PDCCH transmission in the first time-frequency resources and in a second DL DCI format conveyed by the second PDCCH transmission in the second time-frequency resources for the UE unless the first time-frequency resources and the second time-frequency resources are respectively associated with PDCCH transmissions scheduling respective PDSCH transmissions for different data service types having transmission of respective HARQ-ACK information in different HARQ-ACK codebooks; in such case, a total DAI value, as well as a counter DAI value and a slot offset value are independent among DCI formats conveyed by PDCCH transmissions in the first set of time-frequency resources and by PDCCH transmissions in the second set of time-frequency resources.

In FIG. 11, the PDCCH monitoring period is one slot. A counter DAI value for a UE is updated in each DL DCI format conveyed by a respective PDCCH transmission to the UE in any time-frequency resources configured to the UE for PDCCH receptions.

A total DAI value can also be indicated to be same in all DL DCI formats conveyed by PDCCH transmissions in all slots in FIG. 11 instead of being same only in DL DCI formats conveyed by PDCCH transmissions in a same slot. This approach enables a gNB to generate DL DCI formats in a serial manner in each slot, thereby not having to know in advance a total number of DL DCI formats to be conveyed by PDCCH transmissions in the slot in order to set a same respective total DAI value in each of the DL DCI formats. When a total DAI value is set based on a number of DL DCI formats conveyed by PDCCH transmissions over a number of slots (or PDCCH monitoring periods) instead of being updated in every slot (or PDCCH monitoring period), a gNB scheduler is restricted in a number of DL DCI formats that can be conveyed by PDCCH transmissions over the number of slots (or PDCCH monitoring periods) instead of being restricted in a number of DL DCI formats that can be conveyed by PDCCH transmissions in each slot from the number of slots.

For HARQ-ACK transmissions from a UE in response to receptions by the UE of DL DCI formats and data TBs corresponding to different service types, the UE can be configured to transmit separate HARQ-ACK codebooks for each service type. Service type identification can be provided in a DL DCI format, either explicitly through a respective field in the DL DCI format or implicitly, for example through a corresponding DL DCI format size that can be different for different service types. An existence of a counter DAI field, of a total DAI field, or of a slot offset field can be separately configured for DL DCI formats, such as DCI formats associated with different service types. The PDCCH transmissions conveying the DL formats can be in a LIE-specific search space. For example, a DL DCI format scheduling MBB can include these fields while a DL DCI format scheduling low latency services with high reliability or machine-type-communication services does not include these fields, for example because HARQ-ACK information is transmitted individually per data TB, When HARQ-ACK information for different service types is transmitted in different HARQ-ACK codebooks and a counter DAI field or a total DAI field exist in respective DL DCI formats, the corresponding values are set individually for each HARQ-ACK codebook, that is, a functionality of a counter DAI field or of a total DAI field is parallelized for corresponding HARQ-ACK codebooks.

In some embodiments, slot durations for PDSCH transmissions can be different among cells. For simplicity, cells are assumed to be arranged into two groups; a first group of $C_1^{DL}$ cells for PDSCH transmissions within a first slot duration and a second group of $C_2^{DL}$ cells for PDSCH transmissions within a second slot duration. However, the following descriptions can be extended in a straightforward manner in case of additional slot durations. The first slot duration is larger than the second slot duration by an integer factor P.

For example, the first slot duration can correspond to cells using LTE as radio access technology and the second slot duration can correspond to cells using "5G" radio access technology. For example, the first slot duration can correspond to cells using 5G as radio access technology with a first numerology and the second slot duration can correspond to cells using "5G" radio access technology with a second numerology. A slot for HARQ-ACK transmission can have a same duration as the first slot duration, or as the second slot duration, or a third duration that is different that the first slot duration or the second slot duration.

When a UE transmits HARQ-ACK information for cells from the first group of $C_1^{DL}$ cells and cells from the second group of $C_2^{DL}$ cells in a same PUCCH, a slot offset value in a DL DCI format scheduling a PDSCH transmission on a cell from a second group of $C_2^{DL}$ cells remains same in P successive second slots where the first of the P second slots is aligned with the start of a first slot. Therefore, a time reference for the PUCCH transmissions with the shorter slot duration is the longer slot duration.

In a first approach, a value of a counter DAI can be jointly incremented for PDSCH transmissions on both cells from the first group of $C_1^{DL}$ cells and cells from the second group of $C_2^{DL}$ cells. For the purposes of the counter DAI functionality, the second group of $C_2^{DL}$ cells can be viewed as $P \cdot C_1^{DL}$ cells from the first group of cells. In a second approach, a value of a counter DAI can be separately incremented for PDSCH transmissions in the first group of $C_1^{DL}$ cells than for PDSCH transmissions in the second group of $C_2^{DL}$ cells. A counter DAI operation for the second approach for each group of cells can be as in case of a single group of cells as illustrated in FIG. 11.

In the first approach, when a first slot and a second slot for PDCCH transmissions conveying respective DL DCI formats scheduling respective PDSCH transmissions have a same starting position, a total DAT value in each DL DCI format can be set to include both cells from the first group of $C_1^{DL}$ cells and cells from the second group of $C_2^{DL}$ cells. When a starting position of a second slot for PDCCH transmission conveying a DL DCI format scheduling a second PDSCH transmission is after a starting position of a first PDCCH transmission conveying a DL DCI format scheduling a first PDSCH transmission, a total DAI value can include only PDCCH/PDSCH transmissions on cells from the second group of $C_2^{DL}$ cells.

When a scheduler can be committed to a decision for scheduling over P successive second slots at the beginning of the P successive second slots, a total DAT value in each DL DCI format can be set to include both cells from the first group of $C_1^{DL}$ cells and cells from the second group of $C_2^{DK}$ cells regardless of the starting point of the second PDCCH transmission relative to the first PDCCH transmission as the scheduler knows in advance the total DAI value.

Figure 12:
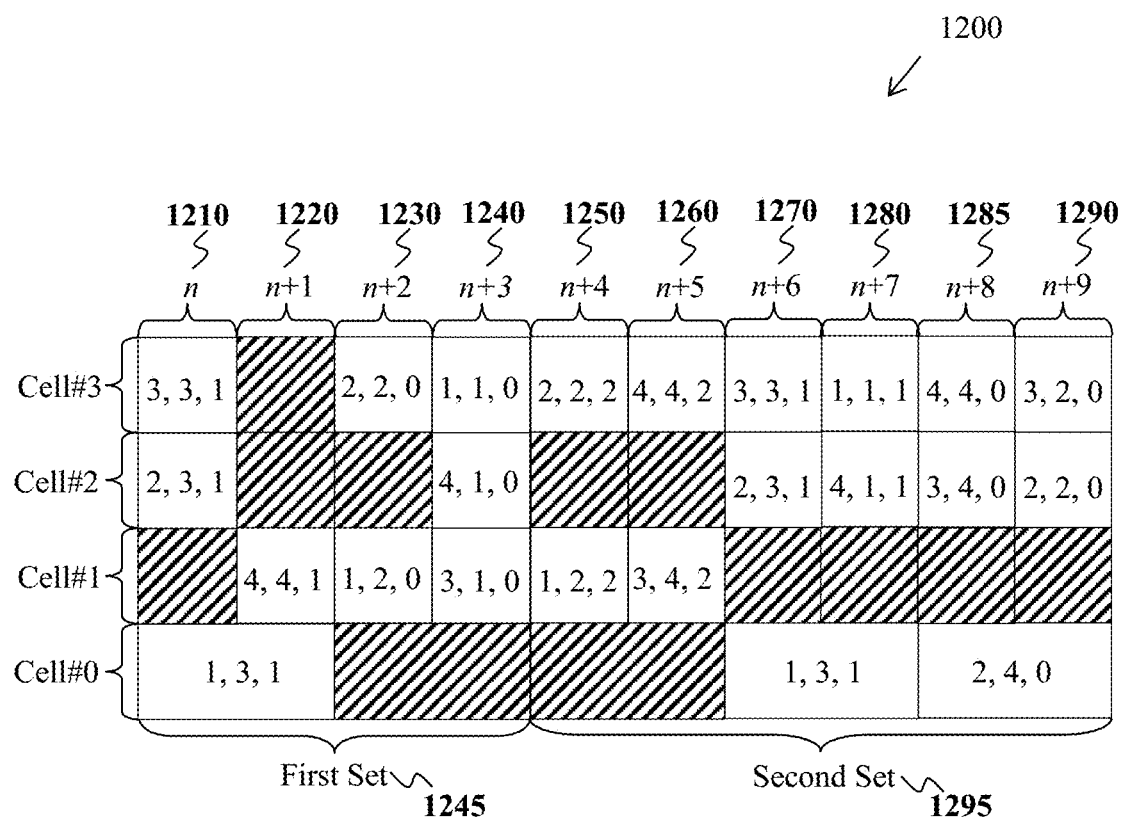
FIG. 12 illustrates an example operation of a counter DAI field, a total DAI field, and a HARQ-ACK transmission slot offset field in DL DCI formats conveyed by PDCCH transmissions at different time instances for scheduling in different cells according to embodiments of the present disclosure.

FIG. 12 illustrates an example operation 1200 of a counter DAI field, a total DAI field, and a HARQ-ACK transmission slot offset field in DL DCI formats conveyed by PDCCH transmissions at different time instances for scheduling in different cells according to embodiments of the present disclosure. An embodiment of the operation 1200 of a counter DAI field, a total DAI field, and a HARQ-ACK transmission slot offset field in DL DCI formats conveyed by PDCCH transmissions at different time instances for scheduling in different cells shown in FIG. 12 is for illustration only. Other embodiments may be used without departing from the scope of the present disclosure.

A DL DCI format scheduling a PDSCH transmission in cell c in a slot includes a counter DAI field with a value $V_{C-DAI,c}^{DL}$, a total DAI with value $V_{T-DAI}^{DL}$, and a slot offset with value $k_1$. There are two groups of cells where a first group includes one cell with a first PDCCH transmission periodicity, such as a slot of a first duration, and a second group includes three cells with a second PDCCH transmission periodicity, such as a slot of a second duration. The first slot duration is twice the second slot duration. In a first PDCCH transmission in a slot of the second duration that is aligned (start at a same symbol) with a first PDCCH transmission in a slot of the first slot duration 1210, there are three DL DCI formats conveyed by respective PDCCH transmissions and scheduling respective PDSCH transmissions to a UE and triplets of values ($V_{C-DAI,c}^{DL}$, $V_{T-DAI}^{DL}$, $k_1$) in associated DL DCI formats are (1, 3, 1), (2, 3, 1), and (3, 3, 1) starting from the cell with the lowest index among cells with PDCCH/PDSCH transmissions in the two first slots.

Cells with the first slot duration for PDCCH transmission periodicity can be assigned lower indexes (or the reverse). In a second slot for PDCCH transmission periodicity with the second slot duration 1220, there is one PDCCH transmission scheduling a respective PDSCH transmission to the UE and a triplet of values ($V_{C-DAI,c}^{DL}$, $V_{T-DAI}^{DL}$, $k_1$) in an associated DL DCI format is (4, 4, 1). In a third slot for PDCCH transmission periodicity with the second slot duration 1230, there are two PDCCH transmission scheduling respective PDSCH transmissions to the UE and triplets of values ($V_{C-DAI,c}^{DL}$, $V_{T-DAI}^{DL}$, $k_1$) in associated DL DCI formats are (1, 2, 0) and (2, 2, 0). In a fourth slot for PDCCH transmission with the second slot duration 1240, there are three PDCCH transmissions scheduling respective PDSCH transmissions to the UE and triplets of values ($V_{C-DAI,c}^{DL}$, $V_{T-DAI}^{DL}$, $k_1$) in associated DL DCI formats are (3, 1, 0), (4, 1 0) and (1, 1, 0).

Based on the $k_1$ value in any of the DL DCI formats, the UE determines that the fourth slot for PDCCH transmission with the second duration is the last slot or that the second slot for PDCCH transmission with the first slot duration is the last slot in a first set of respective slots 1245 where the UE transmits HARQ-ACK information in a same codebook. The triplet of values ($V_{C-DAI,c}^{DL}$, $V_{T-DAI}^{DL}$, $k_1$) in associated DL DCI formats is reset in a DL DCI format scheduling PDSCH on a cell with a lowest index in a fifth slot for PDCCH transmission with the second duration or in a first slot for PDCCH transmission with the first duration 1250 and a similar operation as in the first set of slots applies. Based on the $k_1$ value in any of the DL DCI formats the UE detects in slots n+4 1250 through n+9 1290, the UE determines that the last slot in the second set of slots 1295 is slot n+9 and assumes that the triplet of values ($V_{C-DAI,c}^{DL}$, $V_{T-DAI}^{DL}$, $k_1$) is reset after slot n+9 for PDCCH transmission with the second slot duration.

It is also possible that DL DCI formats only in one of the two groups of cells include a counter DL DCI field or a total DL DAI field. For example, when the first group of $C_1^{DL}$ cells includes a small number of cells, such as 1 or 2 cells, a HARQ-ACK codebook size can be fixed to always be 1 or 2 bits per slot, respectively, for example when a PDSCH transmission mode conveys one data TB or when HARQ-ACK bundling in the spatial domain applies, and a counter DAI or a total DAI need not be included in a DL DCI format.

It is also possible that a UE configured a first group of $C_1^{DL}$ cells with a first PDCCH transmission periodicity, such as a first slot duration, and a second group of $C_2^{DL}$ cells with a second PDCCH transmission periodicity, such as a second slot duration, is also configured separate first and second cells for respective HARQ-ACK transmission in response to PDSCH receptions on cells from the $C_1^{DL}$ cells and on cells from the $C_2^{DL}$ cells respectively. In this case, HARQ-ACK transmission per cell group (CG) is as for a single group of cells.

When a slot offset field is not included in a DL DCI format scheduling a PDSCH transmission, and for one PDSCH transmission per slot, there can be a fixed timing relation between a slot of a PDSCH transmission and a slot of a respective HARQ-ACK transmission. Then, for a UE configured for FDD operation in a first group of $C_1^{DL}$ cells with a first slot duration and in a second group of $C_2^{DL}$ cells with a second slot duration, where the first slot duration is an integer number of P times larger than the second slot duration, the VIE can operate as in a MD mode for HARQ-ACK transmissions with respect to the first group of $C_1^{DL}$ cells and as in a TDD mode for HARQ-ACK transmissions with respect to the second group of $C_2^{DL}$ cells where the UE transmits HARQ-ACK information for up to one slot of the first duration and up to P slots of the second duration in a same codebook.

A gNB and the UE process a counter DAI field and a total DAI field in a DL DCI format scheduling a PDSCH transmission on a cell from the first group of $C_1^{DL}$ cells, when any, as for FDD operation. The gNB and the UE process a counter DAI field and a total DAI field in a DL DCI format scheduling a PDSCH transmission to the UE on a cell from the second group of $C_2^{DL}$ cells, when any, as for TDD operation with an associated slot set size of P slots. The UE can construct and the gNB can deconstruct a HARQ-ACK codebook by placing first in the codebook HARQ-ACK information bits in response to PDSCH receptions (including no PDSCH receptions for cells where the UE failed to detect a respective DL DCI format) in cells from the $C_1^{DL}$ cells and placing second in the codebook HARQ-ACK information bits in response to PDSCH receptions in cells from the $C_2^{DL}$ cells. The reverse can also apply as, over a first slot duration, there are P>1 second slots for PDSCH transmissions on cells from the second group $C_2^{DL}$ cells for each single first slot for PDSCH transmissions on cells from the first group of $C_1^{DL}$ cells.

When a UE configured for FDD operation can receive PDSCH transmissions over a first slot duration and over a second slot duration and can transmit HARQ-ACK over a third slot duration that is longer than the first slot duration by an integer factor of $P_1$ and the second slot duration by an integer factor of $P_2$, the UW can operate as in a TDD mode for HQRQ-ACK transmissions with respect to both the first group of $C_1^{DL}$ cells and the second group of $C_2^{DL}$ cells. The UE transmits HARQ-ACK information in a same codebook in response to PDSCH receptions for up to $P_1$ slots with the first duration and for up to $P_2$ slots with the second duration. The gNB and the UE process a counter DAI field and a total DAI field in a DL DCI format scheduling a PDSCH transmission to the UE as for TDD operation with an associated slot set size of $P_1$ for cells from the first group of $C_1^{DL}$ cells or an associated slot set size of $P_2$ for cells from the second group of $C_2^{DL}$ cells.

In general, regardless of whether a system operation is based on FDD or TDD, when a first slot k where a UE receives PDSCH transmissions from a gNB and a second slot n where the UE transmits respective HARQ-ACK information to the gNB do not have a fixed timing relation, such as n=k+4, an operation of a counter DAI field and a total DAI field in DL DCI formats can be as for a TDD system. This can also be because the gNB can transmit multiple PDSCHs to the UE over multiple slots and the UE needs to transmit respective HARQ-ACK information in a same slot and the multiple slots essentially form an associated slot set.

When a single DL DCI format schedules a number of PDSCH transmissions conveying a number of respective data TBs, a counter DAI value in the DL DCI format is incremented according to the number of PDSCH transmissions. Similar, a total DAI value in the DL DCI format is incremented according to the number of PDSCH transmissions. A location of a HARQ-ACK bit in a HARQ-ACK codebook transmitted by a UE can be determined according to a time, such as symbol in a slot or slot, when the UE detected the DCI format and not according to a time of a respective data TB reception.

Instead of including a counter DAI field or a total DAI field in a DL DCI format scheduling a PDSCH transmission, a gNB can configure a UE with a fixed HARQ-ACK codebook size. A same HARQ-ACK codebook size can apply to all cells or a HARQ-ACK codebook size can be configured per cell or per group of cells. Then, a total DAI field can be omitted from DL DCI formats and only a counter DAI value can be included. Alternatively, a HARQ-ACK mapping field, as is next described, can be included in a DL DCI format.

When a UE is configured a first group of $C_1^{DL}$ cells (first CG) for PDCCH transmissions with a first periodicity, such as a first slot duration, and a second group of $C_2^{DL}$ cells (second CG) for PDCCH transmissions with a second periodicity, such as a second slot duration, where the first slot duration is an integer number of P times larger than the second slot duration, one of the following three approaches can apply for determining a size of a HARQ-ACK codebook that the UE transmits in a same channel for the first CG and the second CG.

In a first approach, a single HARQ-ACK codebook size of H bits is configured to the UE with respect to the first CG and the UE determines a HARQ-ACK codebook size of H×P bits for the second CG. In a second approach, a HARQ-ACK codebook size is configured per CG where the configuration for the second CG can be either explicit or implicit through a scaling factor relative to a configured HARQ-ACK codebook size for the first CG. In a third approach, a gNB configures a UE a HARQ-ACK codebook size individually for each cell in the first CG and each cell in the second CG. The three approaches offer a tradeoff in terms of a configuration granularity of a HARQ-ACK codebook size per cell and a higher layer signaling overhead that is required for the configuration.

In the following, for brevity, a UE is assumed to generate one HARQ-ACK information bit in response to a PDSCH reception. The descriptions can be extended in a straight-forward manner when the UE generates two HARQ-ACK information bits in response to a PDSCH reception, for example when a PDSCH transmission mode is associated with transmission of two data TBs and the UE does not apply HARQ-ACK spatial domain bundling. For each PDSCH reception, the UE generates an ACK or a NACK depending on whether or not, respectively, the UE correctly detects associated data TBs.

A UE can determine a position in a HARQ-ACK codebook for a HARQ-ACK information bit based on a value of a HARQ-ACK mapping field included in an associated DL DCI format. For example, for a HARQ-ACK codebook size of H bits, a HARQ-ACK mapping field can include ceil($\log_2(H)$) bits where ceil( ) is the ceiling function that rounds a number to its next larger integer.

Figure 13:
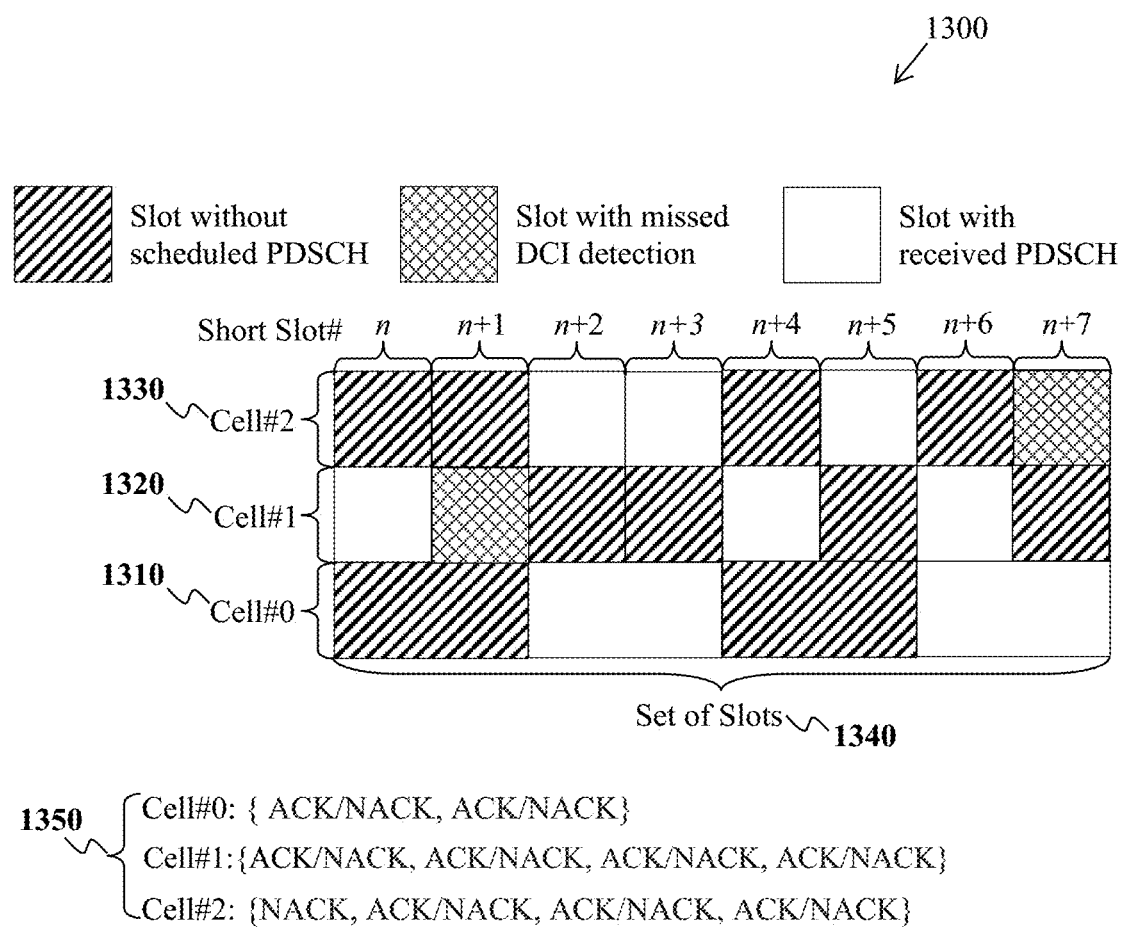
FIG. 13 illustrates an example determination by a UE configured for DL CA operation of a HARQ-ACK codebook using a HARQ-ACK mapping field according to embodiments of the present disclosure.

FIG. 13 illustrates an example determination 1300 by a UE configured for DL CA operation of a HARQ-ACK codebook using a HARQ-ACK mapping field according to embodiments of the present disclosure. An embodiment of the determination 1300 by a UE configured for DL CA operation of a HARQ-ACK codebook using a HARQ-ACK mapping field shown in FIG. 13 is for illustration only. Other embodiments may be used without departing from the scope of the present disclosure.

A gNB configures a UE for DL CA operation with a first cell 1310 using a first slot duration for a PDSCH transmission and with a second cell 1320 and a third cell 1330 using a second slot duration for a PDSCH transmission. The first slot duration is two times longer than the second slot duration. The gNB also configures the UE a first HARQ-ACK codebook size $H_1$ bits for the first cell and a second HARQ-ACK codebook size of $H_2$ bits that is common for the second cell and the third cell. Therefore, a configured HARQ-ACK codebook size can be different for cells with different slot durations for PDSCH transmissions. A DL DCI format transmission to the UE includes a HARQ-ACK mapping field that can have $H_1$ valid values when scheduling a PDSCH transmission in the first cell and $H_2$ valid values when scheduling PDSCH transmission in the second cell or the third cell. For example, the HARQ-ACK mapping field can include ceil($\log_2(H_1)$) bits when scheduling a PDSCH in the first cell and include ceil($\log_2(H_2)$) bits when scheduling a PDSCH in the second cell. For example, $H_2=2H_1$ and $H_1=2$.

For a set of slots 1340 that the UE is indicated in detected DL DCI formats to transmit a HARQ-ACK codebook in a slot and for the first cell, the UE detects a first DL DCI format scheduling a PDSCH in a second slot of an associated slot set and a second DL DCI format scheduling a PDSCH in a fourth slot of the associated slot set and generates an ACK or a NACK value for a respective HARQ-ACK information depending on a correct or incorrect detection, respectively, of associated data TBs. The first and second DL DCI formats include a HARQ-ACK mapping field with respective numeric values of 1 and 2.

For the second cell, the UE detects a first, second, and third DL DCI formats scheduling respective PDSCH transmissions in the first, fifth, and seventh slots of an associated slot set. The first, second, and third DL DCI formats include a HARQ-ACK mapping field with respective numeric values of 1, 3, and 4. The UE can determine that the UE failed to detect a DL DCI format scheduling a PDSCH transmission in a slot between the first slot and fifth slot.

For the third cell, the UE detects a first, second, and third DL DCI formats scheduling respective PDSCH transmissions in the third, fourth, and sixth slots of an associated slot set. The first, second, and third DL DCI formats include a HARQ-ACK mapping field with respective numeric values of 1, 2, or 3. The UE cannot determine that the UE failed to detect a DL DCI format in the eighth slot but the UE generates a correct HARQ-ACK codebook by placing NACK as the last element since the HARQ-ACK codebook has size 4.

Using the HARQ-ACK mapping field, the UE can determine a location for the HARQ-ACK information in a HARQ-ACK codebook for each slot for the second and third cells. When for a same slot association set a UE detects a first DL DCI format with a first HARQ-ACK mapping field value $i_1$ and a second DCI format with a second HARQ-ACK mapping value $i_2$ and $i_2-i_1>1$, the UE places $i_2-i_1-1$ NACK values in the HARQ-ACK codebook in the locations between the location corresponding to the first DL DCI format and the location corresponding to the second DL DCI format.

The UE also places NACK values in the HARQ-ACK codebook in all locations after a location corresponding to a DL DCI format with the largest HARQ-ACK mapping value when this value is smaller than the HARQ-ACK codebook size. The UE can combine the three individual HARQ-ACK codebooks 1350 for each cell according to the cell index. Other combining orders are also possible. For example, the UE can combine the HARQ-ACK codebooks for the three cells according to a slot index starting from the cell with the lowest index (first cell) where HARQ-ACK information for two slots for the second or third cell is combined with HARQ-ACK information for one slot for the first cell.

Instead of including a counter DAI field and a total DAI field or instead of including a HARQ-ACK mapping field, a DL DCI format scheduling a PDSCH transmission can include a HARQ process set field indicating a number of HARQ processes for a UE to report HARQ-ACK information. An UL DCI format scheduling a PUSCH transmission can also include such field. The functionality of the HARQ process set field can be cell-specific or cell-common. For cell-specific functionality, a HARQ process set field indicates to a UE the HARQ processes for the UE to report respective HARQ-ACK information associated with PDSCH transmissions on the cell and a value of the HARQ process set field can be different in DCI formats scheduling PDSCH transmissions on different cells.

For cell-common functionality, a HARQ process set field indicates to a UE the HARQ processes for the UE to report respective HARQ-ACK information associated with PDSCH transmissions for all configured cells and the UE expects a value of the HARQ process set field to be same in DL DCI formats scheduling PDSCH transmissions on different cells. For example, the cell-common functionality can be per CG having a same slot duration for PDSCH transmissions. For example, the functionality of the HARQ process set field can be cell-specific when the field is in a DL DCI format and can be cell-common when the field is in an UL DCI format.

When a UE is configured to support a total of $M_c$ DL HARQ processes for cell c, either through a UE capability or by gNB configuration, a field in a DL DCI format scheduling a PDSCH transmission on cell c can indicate a subset of the $M_c$ DL HARQ processes, possibly including all $M_c$ DL HARQ processes, for the UE to report respective HARQ-ACK information. For example, for $M_c=16$ DL HARQ processes, a 3-bit field can indicate to a UE to report HARQ-ACK for 8 combinations of the $M_c=16$ HARQ processes. The 8 combinations can be configured from the gNB to the UE by higher layer signaling.

For example, one combination can correspond to reporting HARQ-ACK information for all DL HARQ processes. The field indicating the number of HARQ processes can be omitted from a DCI format when a UE always reports HARQ-ACK for all $M_c$ DL HARQ processes for cell c. After each HARQ-ACK report, a UE initializes an HARQ-ACK codebook with NACK values for each of the $M_c$ DL HARQ processes and, for a HARQ process with correct data TB detection, the UE changes a respective NACK value to an ACK value. To improve a scheduler flexibility to assign PDSCH transmission with consecutive HARQ processes, a UE can transmit separately HARQ-ACK information corresponding to retransmissions of data TBs, as identified by a value of a redundancy version (RV) field in a respective DL DCI format, from HARQ-ACK information corresponding to initial transmissions of data TBs.

Figure 14:
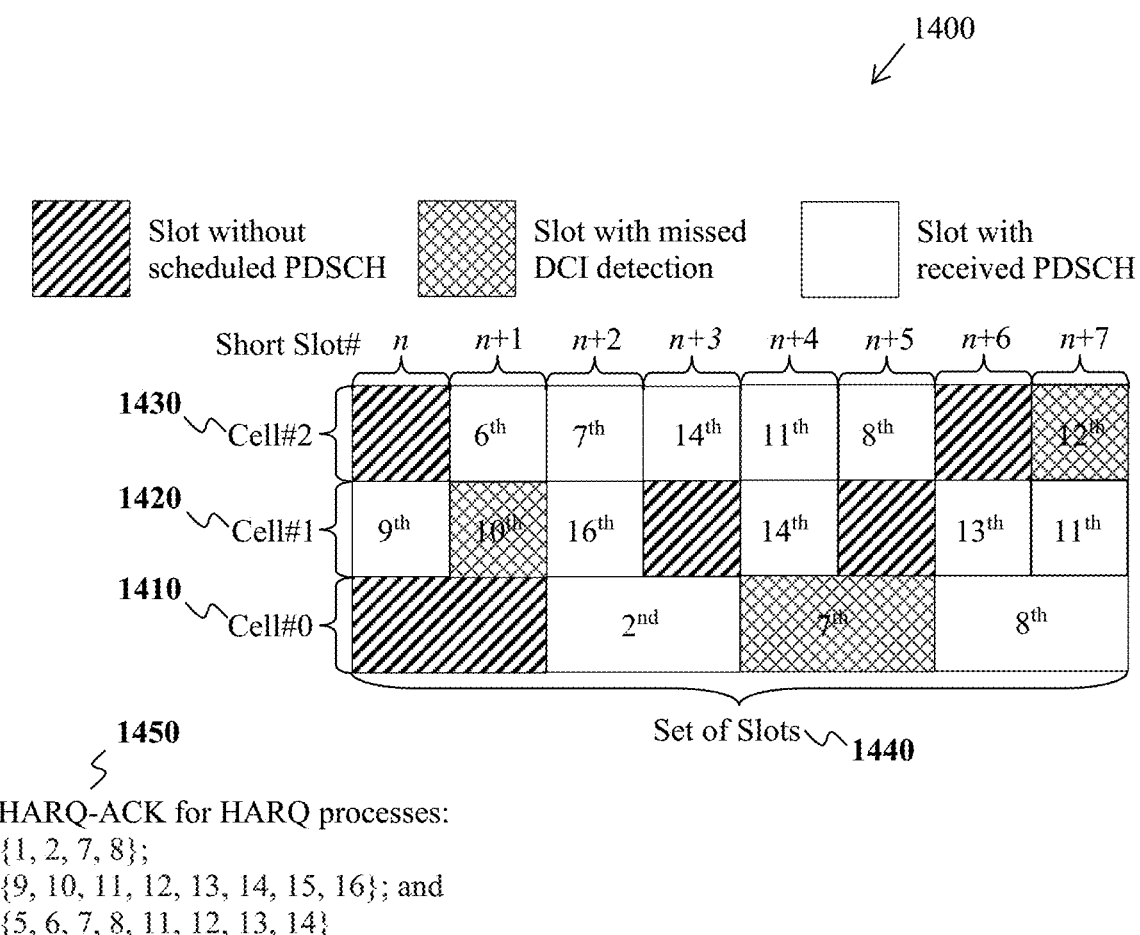
FIG. 14 illustrates an example process for a UE configured with DL CA operation over three cells to transmit HARQ-ACK information for a number of DL HARQ processes per cell according to embodiments of the present disclosure.

FIG. 14 illustrates an example process 1400 for a UE configured with DL CA operation over three cells to transmit HARQ-ACK information for a number of DL HARQ processes per cell according to embodiments of the present disclosure. An embodiment of the process 1400 for a UE configured with DL CA operation over three cells to transmit HARQ-ACK information for a number of DL HARQ processes per cell shown in FIG. 14 is for illustration only. Other embodiments may be used without departing from the scope of the present disclosure.

A gNB configures a UE through higher layer signaling a first configuration of HARQ process sets for a first cell 1410 with a first slot duration for PDSCH transmissions and a second configuration of HARQ process sets for a second cell 1420 and a third cell 1430 with a second slot duration for PDSCH transmissions where the first slot duration is twice the second slot duration. For example, for 16 HARQ processes, a configuration can include 8 HARQ process sets with respective HARQ process numbers {1, 2}, {3, 4}, {5, 6}, {7, 8}, {9, 10}, {11, 12}, {13, 14}, and {15, 16} for the first cell and {1, 2, 3, 4}, {3, 4, 5, 6}, {5, 6, 7, 8}, {7, 8, 9, 10}, {9, 10, 11, 12}, {11, 12, 13, 14}, {13, 14, 15, 16}, and {15, 16, 1, 2} for the second and third cells. Different DL DCI formats can indicate different sets of HARQ processes. For example, HARQ-ACK information in a HARQ-ACK codebook can be arranged first according to the cell number and then according to the HARQ process number.

In the first cell 1410, the UE detects first and third DL DCI formats scheduling respective PDSCH transmissions in second and fourth slots of an associated slot set and the UE fails to detect a third DL DCI format scheduling a PDSCH transmission in a third slot of the slot set 1440 that the UE transmits an associated HARQ-ACK codebook in a same slot. The first DL DCI format can include a HARQ process set field indicating the first HARQ process set {1, 2} and the second and third DL DCI formats can include a HARQ process set field indicating the fourth HARQ process set {7, 8}.

The UE generates a HARQ-ACK codebook with HARQ-ACK information for HARQ process numbers {1, 2, 7, 8} and places a NACK value for each HARQ process number {1 and 7} the UE did not detect a DL DCI format to receive a PDSCH. In the second cell 1420, the UE detects first, third, fourth, fifth, and sixth DL DCI formats scheduling respective PDSCH transmissions in first, third, fifth, seventh, and eighth slots of the associated set of slots and fails to detect a second DL DCI format scheduling a PDSCH transmission in a second slot of the slot set that the UE transmits an associated HARQ-ACK codebook in a same slot.

The first, second, and sixth DL DCI formats can include a HARQ process set field indicating the fifth HARQ process set {9, 10, 11, 12} and the third, fourth, and fifth DL DCI formats can include a HARQ process set field indicating the seventh HARQ process set {13, 14, 15, 16}. The UE generates a HARQ-ACK codebook with HARQ-ACK information for HARQ process numbers {9, 10, 11, 12, 13, 14, 15, 16} and places a NACK value for each HARQ process number {10, 12, and 15} the UE did not receive a PDSCH. In the third cell 1430, the UE detects first, second, third, fourth, and fifth DL DCI formats scheduling respective PDSCH transmissions in second, third, fourth, fifth, and sixth slots of the associated slot set and the UE fails to detect a second DCI format scheduling a PDSCH transmission in a seventh slot of the slot set that the UE transmits an associated HARQ-ACK codebook in a same slot.

The first, second, and fifth DL DCI formats can include a HARQ process set field indicating the third HARQ process set {5, 6, 7, 8} and the third, fourth, and sixth DL DCI formats can include a HARQ process set field indicating the sixth HARQ process set {11, 12, 13, 14}. The UE generates a HARQ-ACK codebook with HARQ-ACK information for HARQ process numbers {5, 6, 7, 8, 11, 12, 13, 14} and places a NACK value for each HARQ process number {5, 12, and 13} the UE did not receive a PDSCH. A combined HARQ-ACK codebook includes HARQ process numbers {1, 2, 7, 8} for the first cell, {9, 10, 11, 12, 13, 14, 15, 16} for the second cell, and {5, 6, 7, 8, 11, 12, 13, 14} for the third cell 1450.

In some embodiments, a transmission power from a UE configured for UL CA operation is determined where DL transmission durations, referred to as slot durations, or UL transmission durations (slot durations), can be different among cells (or carriers). For simplicity of the descriptions, cells are assumed to be arranged in to two groups; a DL transmission or an UL transmission has a first duration in a first group of $C_1^{DL}$ DL cells or $C_1^{UL}$ cells, respectively, and a second duration in a second group of $C_2^{DL}$ DL cells or $C_2^{UL}$ cells, respectively. It is not required that a DL transmission for a DL cell has a same duration as an UL transmission slot for an associated UL cell. Extensions to more than two cell groups (CGs) can follow similar principles. The first slot duration $T_1$ is longer that the second slot duration $T_2$ by an integer factor of $P>1$, that is $T_1=P \cdot T_2$. When P=1, a power allocation method can be as for CA operation among cells with same slot duration. In the following, $\hat{P}_{CMAX}(i_1, i_2)$ denotes a linear value of a maximum configured transmission power for a slot pair $(i_1, i_2)$ or, in general, between two overlapping transmissions with respective durations $i_1$ and $i_2$.

In some embodiments, a first slot with duration $i_1$ and a second slot with duration $i_2$ have a same starting point and all UL transmissions convey data in respective PUSCHs without any UCI transmission or SRS transmission. In the following, it is assumed that when a UE does not have an UL transmission on a cell during a slot, a respective transmission power is zero.

In one embodiment for power allocation from a UE, each PUSCH transmission power, regardless of whether on a cell from the first CG of $C_1^{UL}$ cells (CG1) or on a cell from the second CG of $C_2^{UL}$ cells (CG2), can be scaled with a same factor in a first slot $i_1$ and in a second slot $i_2$ so that $$\sum_{c=0}^{c_1^{UL}-1} w_c(i_1) \cdot \hat{P}_{PUSCH,c}(i_1) + \sum_{c=0}^{c_2^{UL}-1} w_c(i_2) \cdot \hat{P}_{PUSCH,c}(i_2) \le \hat{P}_{CMAX}(i_1, i_2)$$

where $w_c(i_1)=w_c(i_2)$ unless for some cell a resulting transmission power is too low and the UE can then set $w_c(i_1)=0$ or $w_c(i_2)=0$.

For PUSCH transmissions on the $c_2^{UL}$ cells in a second slot $i_2+j$, $0<j \le P-1$, each PUSCH transmission power $\hat{P}_{PUSCH,c}(i_2+J)$ on a cell c is determined according to a corresponding power control process when $$\sum_{c=0}^{c_2^{UL}-1} \hat{P}_{PUSCH,c}(i_2+j) \le \hat{P}_{CMAX}(i_1, i_2+j) - \sum_{c=0}^{c_1^{UL}-1} w_c(i_1) \cdot \hat{P}_{PUSCH,c}(i_1)$$

or by scaling each such PUSCH transmission power by a factor $w_c(i_2+j)$ so that $$\sum_{c=0}^{c_2^{UL}-1} w_c(i_2+j) \cdot \hat{P}_{PUSCH,c}(i_2+j) \le$$

$$\hat{P}_{CMAX}(i_1, i_2+j) - \sum_{c=0}^{c_1^{UL}-1} w_c(i_1) \cdot \hat{P}_{PUSCH,c}(i_1)$$

when $$\sum_{c=0}^{c_2^{UL}-1} \hat{P}_{PUSCH,c}(i_2+j) > \hat{P}_{CMAX}(i_1, i_2+j) - \sum_{c=0}^{c_1^{UL}-1} w_c(i_1) \cdot \hat{P}_{PUSCH,c}(i_1).$$

When $$\sum_{c=0}^{c_1^{UL}-1} \hat{P}_{PUSCH,c}(i_1) + \sum_{c=0}^{c_2^{UL}-1} \hat{P}_{PUSCH,c}(i_2) \le \hat{P}_{CMAX}(i_1, i_2),$$

It is possible that $\hat{P}_{CMAX}(i_1, i_2+j)$ is same for all values of $i_2+j$, $0<j \le P-1$.

Figure 15:
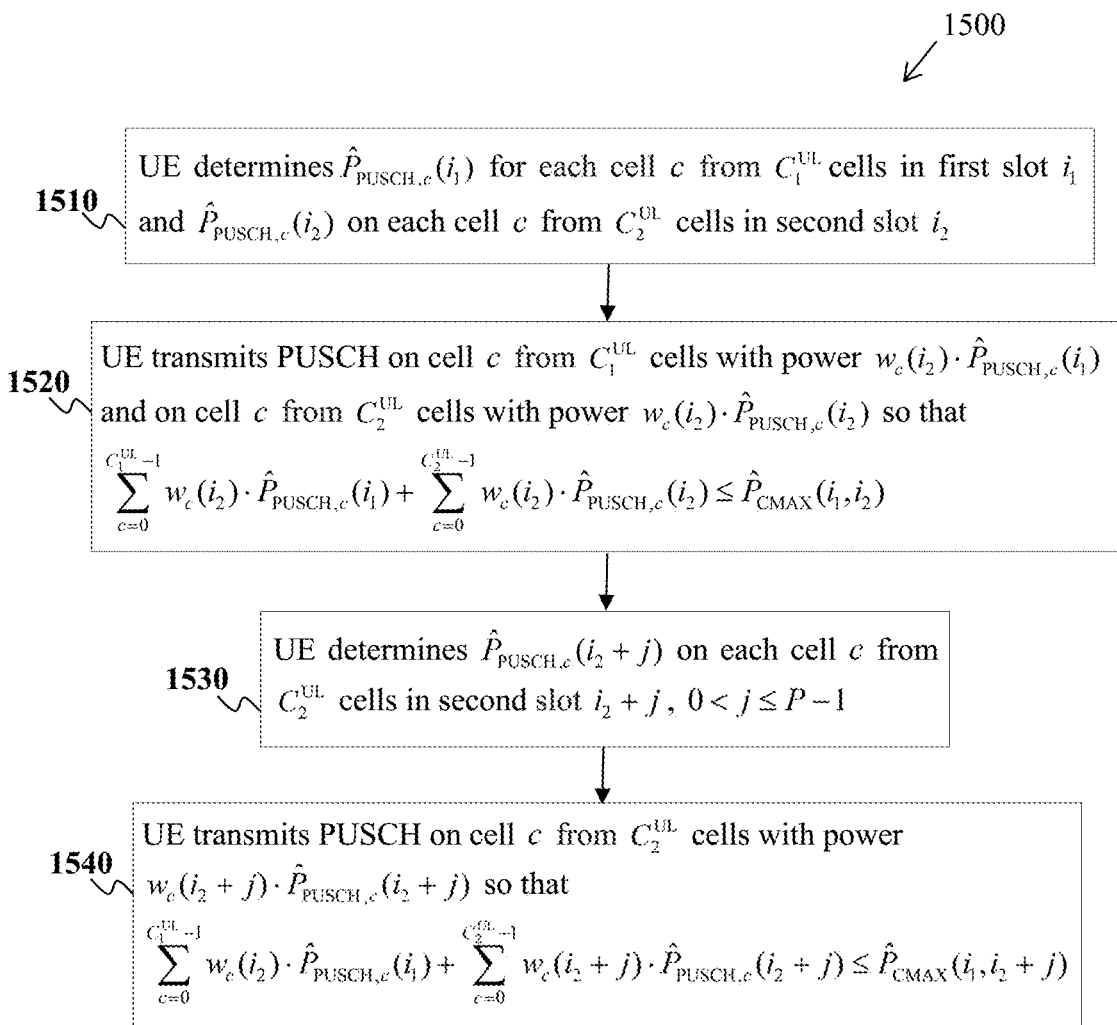
FIG. 15 illustrates an example method for a UE to determine a power for PtJSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1 = P \cdot i_2$ according to embodiments of the present disclosure.

FIG. 15 illustrates an example method 1500 for a UE to determine a power for PUSCH transmissions on $C_1^{UL}$ cells in a first slot $i_1$ and on $C_{2_{UL}}$ cells in second slots $i_2+j$, $0 \leq j \leq P-1$, when first slot $i_1$ and second slot $i_2$ start at a same time and $i_1 = P \cdot i_2$ according to embodiments of the present disclosure. An embodiment of the method 1500 for a UE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1 = P \cdot i_2$ shown in FIG. 15 is for illustration only. Other embodiments may be used without departing from the scope of the present disclosure.

In step 1510, a UE determines a power $\hat{P}_{PUSCH,c}(i_1)$ for each PUSCH transmission on each cell c from $C_1^{UL}$ cells (CG1) in a first slot $i_1$ and a power $\hat{P}_{PUSCH,c}(i_2)$ for each PUSCH transmission on each cell c from $C_2^{UL}$ cells (CG2) in a second slot $i_2$ according to a respective power control process. The second slot $i_2$ starts at a same time as the first slot $i_1$. A duration of the first slot is longer than a duration of the second slot by an integer factor P. The UE, in step 1520, scales each determined power by a factor $w_c(i_2) \leq 1$ so that $$\sum_{c=0}^{c_1^{UL}-1} w_c(i_2) \cdot \hat{P}_{PUSCH,c}(i_1) + \sum_{c=0}^{c_2^{UL}-1} w_c(i_2) \cdot \hat{P}_{PUSCH,c}(i_2) \leq \hat{P}_{CMAX}(i_1, i_2)$$

and transmits a corresponding PUSCH with the scaled power. The value of $w_c(i_2)$ can be the largest value achieving the previous condition, including $w_c(i_2)=1$ meaning no scaling, and for some cells the UE can set $w_c(i_2)=0$, for example when a resulting scaled power is too small. In a later slot $i_2+j$, $0<j \leq P-1$, the UE determines, in step 1530, a power $\hat{P}_{PUSCH,c}(i_2+j)$ for each PUSCH transmission on each cell from the $C_2^{UL}$ cells according to a corresponding power control process and the UE transmits, in step 1540, a PUSCH on a cell c from the $C_2^{UL}$ cells with a power $w_c(i_2+j) \cdot \hat{P}_{PUSCH,c}(i_2+j)$ so that $$\sum_{c=0}^{c_1^{UL}-1} w_c(i_2) \cdot \hat{P}_{PUSCH,c}(i_1) + \sum_{c=0}^{c_2^{UL}-1} w_c(i_2+j) \cdot \hat{P}_{PUSCH,c}(i_2+j) \leq$$

$$\hat{P}_{CMAX}(i_1, i_2+j).$$

Figure 16:
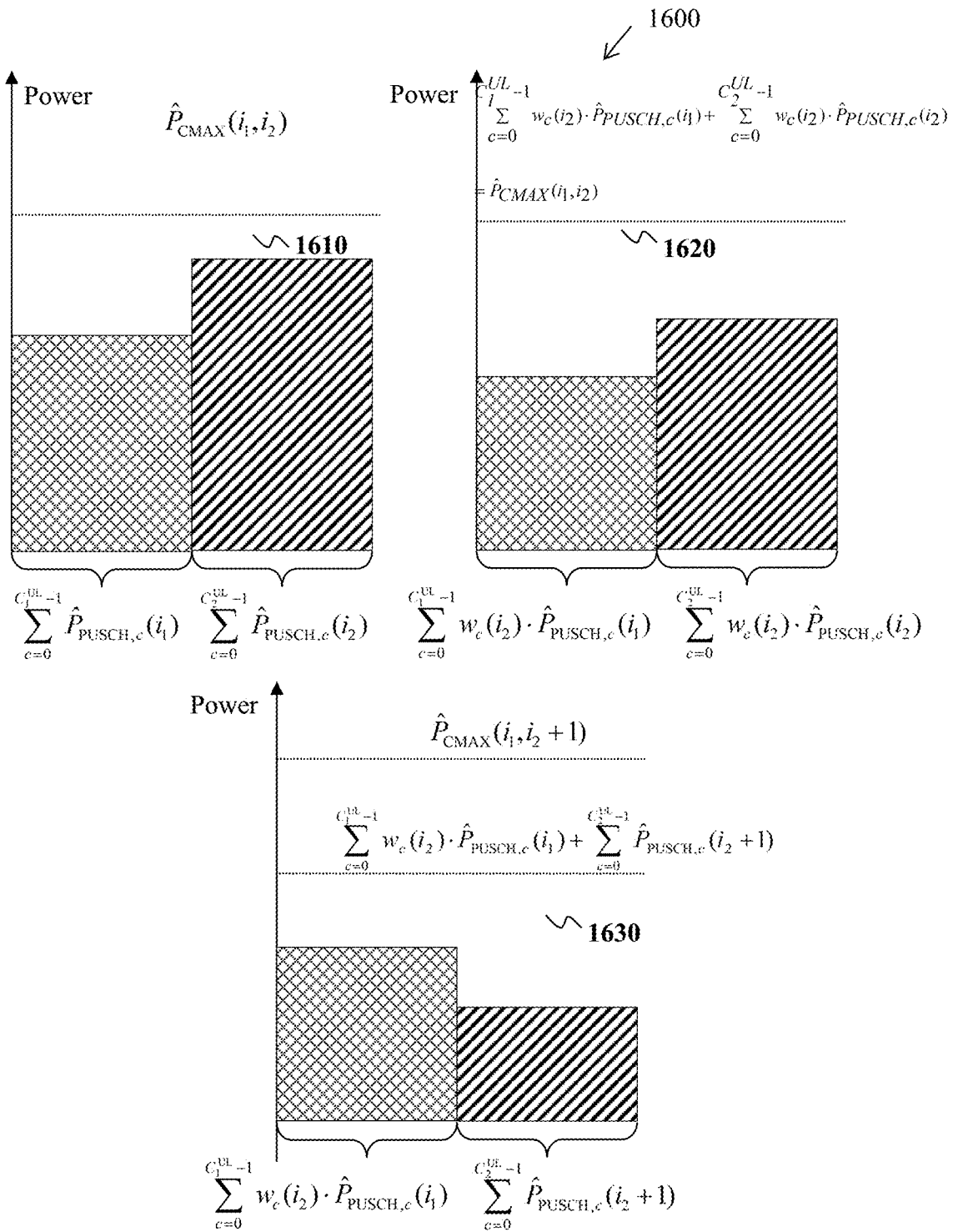
FIG. 16 illustrates an example total PUSCH transmission power on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1=P \cdot i_2$ according to embodiments of the present disclosure.

FIG. 16 illustrates an example total PUSCH transmission power 1600 on CN cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1 = P \cdot i_2$ according to embodiments of the present disclosure. An embodiment of the total PUSCH transmission power 1600 on $C_1^{UL}$ cells in a first slot Li and a total PUSCH transmission power on $C_2^{UL}$ cells in second slots $i_2$ and $i_2+1$ according to PUSCH transmission power when slot $i_1$ and slot $i_2$ start at a same time and $i_1 = P-i_2$ shown in FIG. 16 is for illustration only. Other embodiments may be used without departing from the scope of the present disclosure.

A UE determines a power $\hat{P}_{PUSCH,c}(i_1)$ for each PUSCH transmission on each cell c from $C_1^{UL}$ cells in a first slot $i_1$ and a power $\hat{P}_{PUSCH,c}(i_2)$ for each PUSCH transmission on each cell c from $C_2^{UL}$ cells in a second slot $i_2$ according to a respective power control process. The second slot $i_2$ starts at a same time as the first slot $i_1$. A duration of the first slot is twice a duration of the second slot. It is $$\sum_{c=0}^{c_1^{UL}-1} \hat{P}_{PUSCH,c}(i_1) + \sum_{c=0}^{c_2^{UL}-1} \hat{P}_{PUSCH,c}(i_2) > \hat{P}_{CMAX}(i_1, i_2)$$

The UE scales by $w_c(i_2)$ each $\hat{P}_{PUSCH,c}(i_1)$ and each $\hat{P}_{PUSCH,c}(i_2$ for PUSCH transmissions on respective cells so that $$\sum_{c=0}^{c_1^{UL}-1} w_c(i_2) \cdot \hat{P}_{PUSCH,c}(i_1) + \sum_{c=0}^{c_2^{UL}-1} w_c(i_2) \cdot \hat{P}_{PUSCH,c}(i_2) \leq \hat{P}_{CMAX}(i_1, i_2)$$

In a next second slot $i_2+1$, the UE determines a power $\hat{P}_{PUSCH,c}(i_2+1)$ for each PUSCH transmission on each cell from the $C_2^{UL}$ cells according to a corresponding power control process and the UE transmits a PUSCH on a cell c from the $C_2^{UL}$ cells with a power $\hat{P}_{PUSCH,c}(i_2+1)$ since $$\sum_{c=0}^{c_1^{UL}-1} w_c(i_2) \cdot \hat{P}_{PUSCH,c}(i_1) + \sum_{c=0}^{c_2^{UL}-1} \hat{P}_{PUSCH,c}(i_2+1) < \hat{P}_{CMAX}(i_1, i_2+1)$$

Although a PUSCH transmission on cell c from the $C_1^{UL}$ cells in the first slot $i_1$ is with reduced power $w_c(i_2) \cdot \hat{P}_{PUSCH,c}(i_1)$, as $w_c(i_2)<1$, and a total transmission power in second slot $i_2+1$ is less than a maximum available power $\hat{P}_{CMAX}(i_1, i_2+1)$, the UE does not increase the PUSCH transmission power on any cell c from the $C_1^{UL}$ cells in the part of the first slot $i_1$ that overlaps with $i_2+1$.

A disadvantage of the aforementioned power allocation embodiments, as also shown in FIG. 16, is that a PUSCH transmission power is reduced throughout the first slot $i_1$ even when there is available transmission power after the initial second slot $i_2$ such as for example when in second slot $i_2+1$ a total transmission power $$\sum_{c=0}^{c_2^{UL}-1} \hat{P}_{PUSCH,c}(i_2+1)$$

on the $C_2^{UL}$ cells is such that $$\sum_{c=0}^{c_1^{UL}-1} \hat{P}_{PUSCH,c}(i_1) + \sum_{c=0}^{c_2^{UL}-1} \hat{P}_{PUSCH,c}(i_2+1) \leq \hat{P}_{CMAX}(i_1, i_2+1).$$

In one embodiment for power allocation from a UE, a power is first prioritized for PUSCH transmissions on the $C_1^{UL}$ cells in the first slot $i_1$ and remaining power, when any, is allocated to PUSCH transmissions on the $C_2^{UL}$ cells in the second slots $i_2+j$, $0 \leq j \leq P-1$. A power $\hat{P}_{PUSCH,c}(i_1)$ for each PUSCH transmission on each respective cell c from the $C_1^{UL}$ cells in the first slot $i_1$ can be determined according to respective power control process and can be further scaled, when needed, by $w_c(i_1)$ so that $$\sum_{c=0}^{c_1^{UL}-1} w_c(i_2) \cdot \hat{P}_{PUSCH,c}(i_1) \leq \hat{P}_{CMAX}(i_1, i_2).$$

It is $w_c(i_1)=1$ when $$\sum_{c=0}^{C_1^{UL}-1} \hat{P}_{PUSCH,c}(i_1) \leq \hat{P}_{CMAX}(i_1, i_2).$$

A power $\hat{P}_{PUSCH,c}(i_2+j)$ for each PUSCH transmission on each respective cell c from the $C_2^{UL}$ cells in the second slot $i_2+j$ can be determined according to a respective power control process and can be further scaled, when needed, by $w_c(i_2+j)$ so that $$\sum_{c=0}^{C_2^{UL}-1} w_c(i_2+j) \cdot \hat{P}_{PUSCH,c}(i_2+j) \leq \left( \hat{P}_{CMAX}(i_1, i_2) - \sum_{c=0}^{C_1^{UL}-1} w_c(i_1) \cdot \hat{P}_{PUSCH,c}(i_1) \right).$$

When $$\sum_{c=0}^{C_1^{UL}-1} w_c(i_1) \cdot \hat{P}_{PUSCH,c}(i_1) = \hat{P}_{CMAX}(i_1, i_2)$$

PUSCH transmissions on the $C_2^{UL}$ cells in the second slot $i_2+j$ can be dropped. The aforementioned embodiments are equivalent when there are no PUSCH transmissions on the $C_2^{UL}$ cells in the second slot $i_2$.

Figure 17:
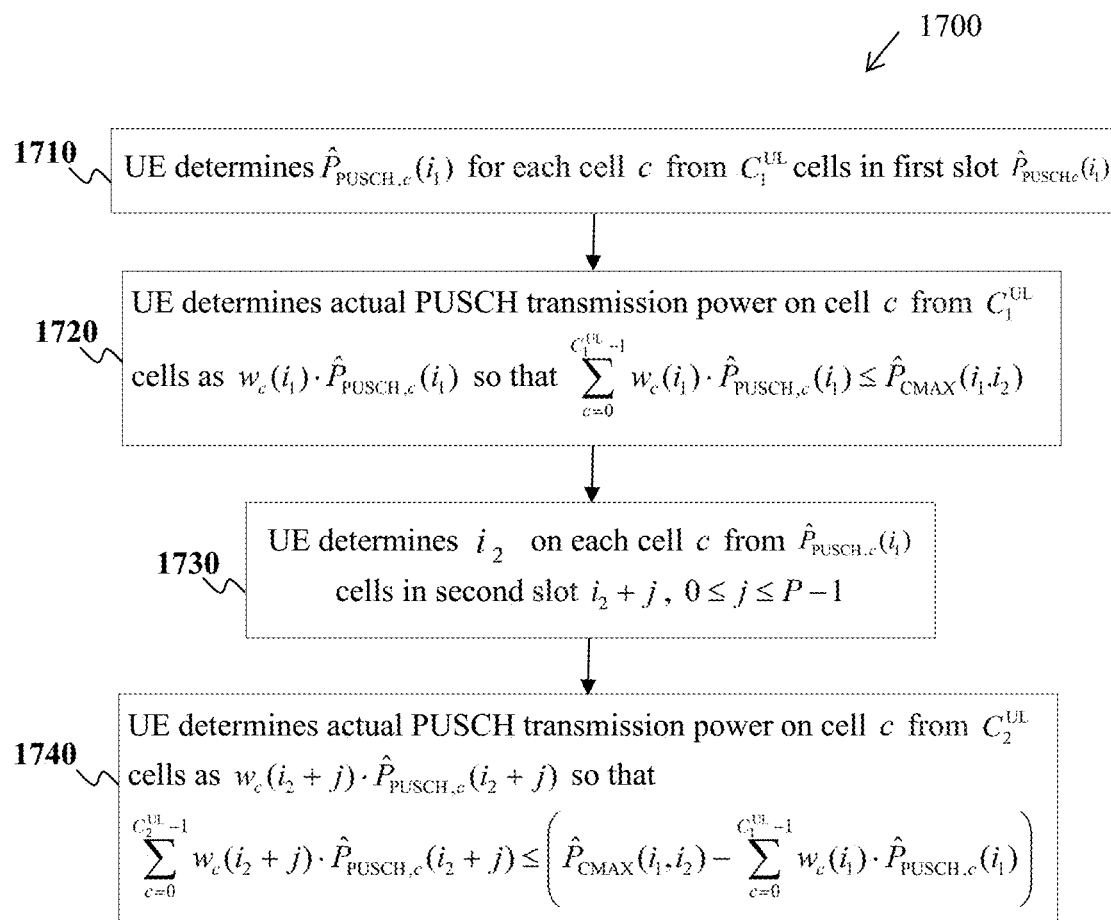
FIG. 17 illustrates another example method for a UE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1=P \cdot i_2$ according to embodiments of the present disclosure.

FIG. 17 illustrates another example method 1700 for a UE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1 = P \cdot i_2$ according to embodiments of the present disclosure. An embodiment of the method 1700 for a UE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1 = P \cdot i_2$ shown in FIG. 17 is for illustration only. Other embodiments may be used without departing from the scope of the present disclosure.

A UE determines, in step 1710, a power $\hat{P}_{PUSCH,c}(i_1)$ for each PUSCH transmission on each cell c from $C_1^{UL}$ cells in a first slot $i_1$ according to a respective power control process and, in step 1720, a respective actual PUSCH transmission power $w_c(i_1) \cdot \hat{P}_{PUSCH,c}(i_1)$ so that $$\sum_{c=0}^{C_1^{UL}-1} w_c(i_1) \cdot \hat{P}_{PUSCH,c}(i_1) \leq \hat{P}_{CMAX}(i_1, i_2).$$

It is $w_c(i_1)=1$ when $$\sum_{c=0}^{C_1^{UL}-1} \hat{P}_{PUSCH,c}(i_1) \leq \hat{P}_{CMAX}(i_1, i_2).$$

The UE determines a power $\hat{P}_{PUSCH,c}(i_2+j)$, $0 \leq j \leq P-1$, for each PUSCH transmission on each cell c from $C_2^{UL}$ cells in a second slot $i_2+j$ according to a respective power control process in step 1730 and a respective actual PUSCH transmission power $w_c(i_2+j) \cdot \hat{P}_{PUSCH,c}(i_2+j)$ so that $$\sum_{c=0}^{C_2^{UL}-1} w_c(i_2+j) \cdot \hat{P}_{PUSCH,c}(i_2+j) \leq \left( \hat{P}_{CMAX}(i_1, i_2) - \sum_{c=0}^{C_1^{UL}-1} w_c(i_1) \cdot \hat{P}_{PUSCH,c}(i_1) \right)$$

in step 1740.

Figure 18:
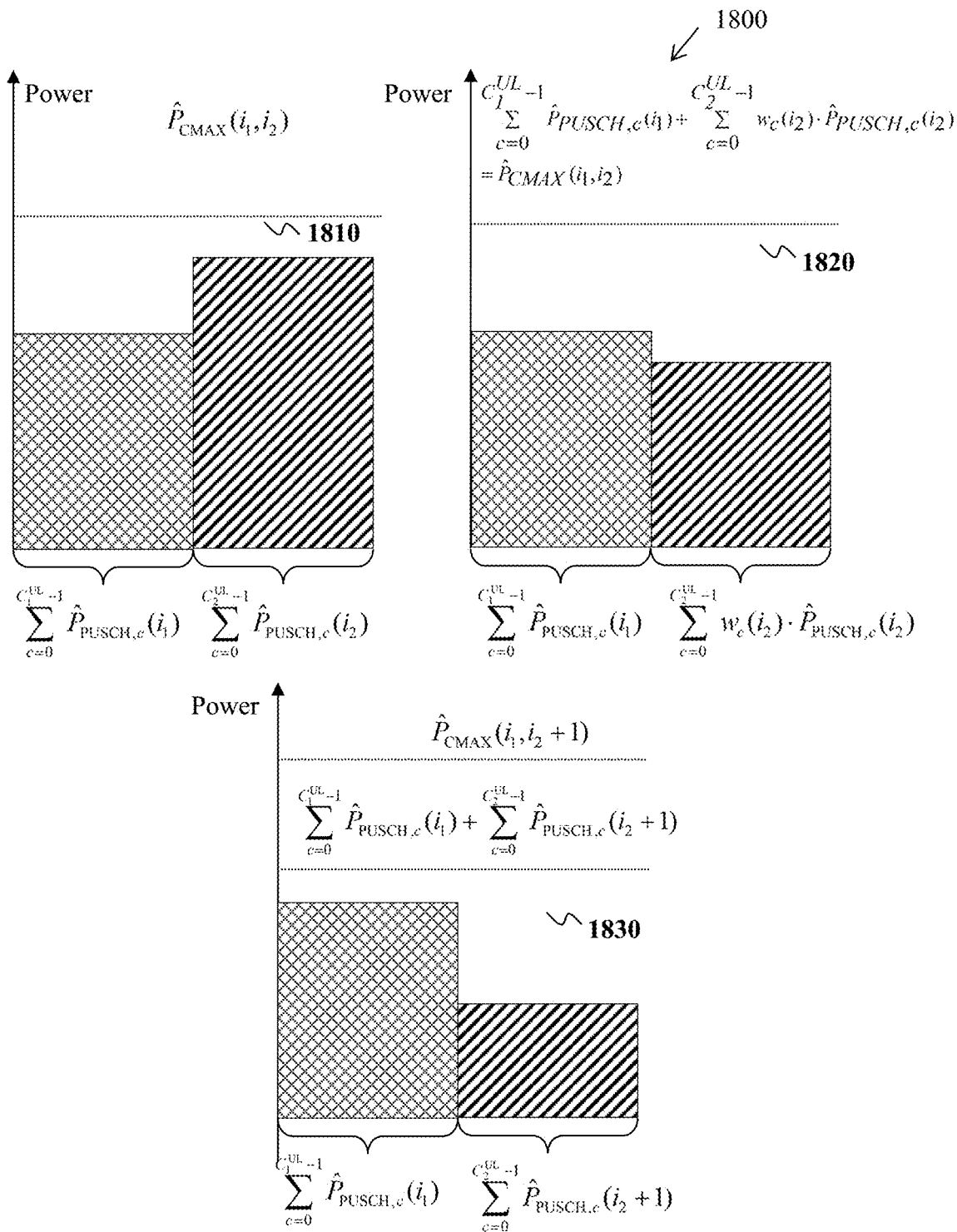
FIG. 18 illustrates an example total PUSCH transmission power on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1=P \cdot i_2$ according to embodiments of the present disclosure.

FIG. 18 illustrates an example total PUSCH transmission power 1800 on $C_{21}^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1 = P \cdot i_2$ according to embodiments of the present disclosure. An embodiment of the total PUSCH transmission power 1800 on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1 = P \cdot i_2$ shown in FIG. 18 is for illustration only. Other embodiments may be used without departing from the scope of the present disclosure.

The second slot $i_2$ starts at a same time as the first slot $i_1$. A duration of the first slot is twice a duration of the second slot. A UE determines a power $\hat{P}_{PUSCH,c}(i_1)$ for each PUSCH transmission on each cell c from $C_1^{UL}$ cells in a first slot $i_1$ according to a respective power control process and an actual power $w_c(i_1) \cdot \hat{P}_{PUSCH,c}(i_1)$ for each PUSCH transmission so that $$\sum_{c=0}^{C_1^{UL}-1} w_c(i_1) \cdot \hat{P}_{PUSCH,c}(i_1) \leq \hat{P}_{CMAX}(i_1, i_2). \text{ As } \sum_{c=0}^{C_1^{UL}-1} \hat{P}_{PUSCH,c}(i_1) \leq \hat{P}_{CMAX}(i_1, i_2),$$

it is $W_c(i_1)=1$. The UE determines a power $\hat{P}_{PUSCH,c}(i_2)$ for each PUSCH transmission on each cell c from $C_2^{UL}$ cells in a second slot $i_2$ according to a respective power control process. As $$\sum_{c=0}^{C_2^{UL}-1} \hat{P}_{PUSCH,c}(i_2+j) > \left( \hat{P}_{CMAX}(i_1, i_2) - \sum_{c=0}^{C_1^{UL}-1} \hat{P}_{PUSCH,c}(i_1) \right)$$

the UE determines an actual power $w_c(i_2) \cdot \hat{P}_{PUSCH,c}(i_2)$ for each PUSCH transmission on each cell c from $C_2^{UL}$ cells in the second slot $i_2$ so that $$\sum_{c=0}^{C_2^{UL}-1} w_c(i_2) \cdot \hat{P}_{PUSCH,c}(i_2) \leq \left( \hat{P}_{CMAX}(i_1, i_2) - \sum_{c=0}^{C_1^{UL}-1} \hat{P}_{PUSCH,c}(i_1) \right)$$

The UE determines a power $\hat{P}_{PUSCH,c}(i_2+1)$ for each PUSCH transmission on each cell c from $C_2^{UL}$ cells in a second slot $i_2+1$ according to a respective power control process.

As $$\sum_{c=0}^{c_2^{UL}-1} \hat{P}_{PUSCH,c}(i_2+1) \leq \left(\hat{P}_{CMAX}(i_1, i_2+j) - \sum_{c=0}^{c_1^{UL}-1} \hat{P}_{PUSCH,c}(i_1)\right),$$

the UE determines an actual power $\hat{P}_{PUSCH,c}(i_2)$ for each PUSCH transmission on each cell c from $C_2^{UL}$ cells in the second slot $i_2+1$ 1830.

The aforementioned embodiments, two opposite approaches in prioritizing power as cells from the $C_1^{UL}$ cells are either treated with a same priority as cells from the $C_2^{UL}$ cells according to the first approach or with absolute higher priority than cells from the $C_2^{UL}$ cells according to the second approach. The respective power allocation principles can be combined to enable a network to control a power allocation priority for cells from the $C_1^{UL}$ cells and for cells from the $C_2^{UL}$ cells. A network can configure by higher layer signaling to a UE a priority factor Q for transmissions on cells from the $C_1^{UL}$ cells and a priority factor 1−Q for transmissions on cells from the $C_2^{UL}$ cells. For example, for the aforementioned embodiments, Q=0.5 while for Q=1. Then, when $$\sum_{c=0}^{c_1^{UL}-1} \hat{P}_{PUSCH,c}(i_1) + \sum_{c=0}^{c_2^{UL}-1} \hat{P}_{PUSCH,c}(i_2) > \hat{P}_{CMAX}(i_1, i_2),$$

a UE can determine power scaling factors $w_c(i_1) = w_c(i_2)$ so that $$\sum_{c=0}^{c_1^{UL}-1} Q \cdot w_c(i_1) \cdot \hat{P}_{PUSCH,c}(i_1) + \sum_{c=0}^{c_2^{UL}-1} (1-Q) \cdot w_c(i_2) \cdot \hat{P}_{PUSCH,c}(i_2) \leq \hat{P}_{CMAX}(i_1, i_2).$$

In one embodiment for power allocation by a UE, each PUSCH transmission power, regardless of whether on a cell from the $C_1^{UL}$ cells or on a cell from the $C_2^{UL}$ cells, is scaled with a same factor so that during each second slot duration a total transmission power is smaller than or equal to $\hat{P}_{CMAX}$ As a consequence, an actual PUSCH transmission power on each respective cell c from the $C_1^{UL}$ cells in the first slot $i_1$ varies depending on an overlapping second slot $i_2+j$, $0 \leq j \leq P-1$ while an actual PUSCH transmission power on each respective cell c from the $C_2^{UL}$ cells in each second slot $i_2+j$ is constant. As is subsequently discussed, this can be beneficial in prioritizing power allocation to PUCCH or PRACH transmissions on a cell c from the $C_2^{UL}$ cells.

In each second slot $i_2+j$, an actual PUSCH transmission power $w_c(i_2+j) \cdot \hat{P}_{PUSCH,c}(i_1)$ on each respective cell c from the $C_1^{UL}$ cells and an actual PUSCH transmission power $w_c(i_2+j) \cdot \hat{P}_{PUSCH,c}(i_2+j)$ on each respective cell c from the $C_2^{UL}$ cells are determined so that $$\sum_{c=0}^{c_1^{UL}-1} w_c(i_2+j) \cdot \hat{P}_{PUSCH,c}(i_1) + \sum_{c=0}^{c_2^{UL}-1} w_c(i_2+j) \cdot \hat{P}_{PUSCH,c}(i_2+j) \leq \hat{P}_{CMAX}(i_2+j).$$

When in the second slot $i_2+j$ it is $$\sum_{c=0}^{c_1^{UL}-1} \hat{P}_{PUSCH,c}(i_1) + \sum_{c=0}^{c_2^{UL}-1} \hat{P}_{PUSCH,c}(i_2+j) \leq \hat{P}_{CMAX}(i_2+j), w_c(i_2+j) = 1.$$

It is also possible to use $\hat{P}_{CMAX}(i_1)$ instead of $\hat{P}_{CMAX}(i_2+j)$. The third power allocation aims to enable a UE to utilize all available transmission power in each second slot $i_2+j$. In general, in a second slot $i_2+j$, the aforementioned embodiment results to a total PUSCH transmission power of $$\min\left\{\left(\sum_{c=0}^{c_1^{UL}-1} \hat{P}_{PUSCH,c}(i_1) + \sum_{c=0}^{c_2^{UL}-1} \hat{P}_{PUSCH,c}(i_2+j)\right), \hat{P}_{CMAX}(i_2+j)\right\}.$$

However, when variations exist in an actual PUSCH transmission power during the first slot $i_1$, reception reliability of data symbols can be degraded in case of QAM-based modulations. Such degradation can be mitigated at a reception point by demodulating data information symbols or UCI symbols in first slot symbols using a channel estimate based on DMRS that is transmitted in second slot symbols that have a same transmission power as the first slot symbols. For example, when a slot on a cell from the $C_1^{UL}$ cells has duration of 1 msec, 1 slot symbol with DMRS in the first 0.5 msec, and 1 slot symbol with DMRS in the second 0.5 msec, PUSCH power variations can occur between the first 0.5 msec and the second 0.5 msec while a PUSCH transmission power is same during the first 0.5 msec and the second 0.5 msec. A reception point can then demodulate data information symbols or UCI symbols in the first 0.5 msec using a channel estimate obtained only from the DMRS in the first 0.5 msec and demodulate data information symbols or UCI symbols in the second 0.5 msec using a channel estimate obtained only from the DMRS in the second 0.5 msec and the reception point can avoid filtering the DMRS in the first 0.5 msec with the DMRS in the second 0.5 msec in obtaining a channel estimate at least when the reception point can expect that a UE transmission power limitation may have occurred.

Figure 19:
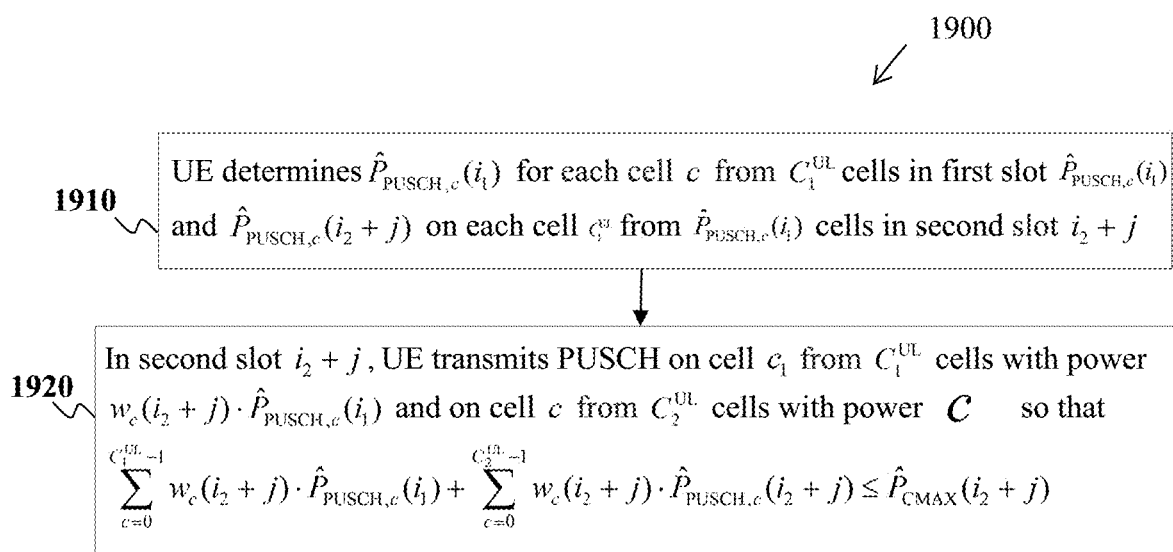
FIG. 19 illustrates yet another example method for a TIE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and according to embodiments of the present disclosure.

FIG. 19 illustrates yet another example method 1900 for a UE to determine a power for PUSCH transmissions on $C_1^{UL}$ cells in a first slot $i_1$ and on $C_2^{UL}$ cells in second slots $i_2+j$, $0 \leq j \leq P-1$, when first slot $i_1$ and second slot $i_2$ start at a same time and $i_1 = P \cdot i_2$ according to embodiments of the present disclosure. An embodiment of the method 1900 for a UE to determine a power for PUSCH transmissions on $C_1^{UL}$ cells in a first slot $i_1$ and on Cu cells in second slots $i_2+j$, $0 \leq j \leq P-1$, when first slot $i_1$ and second slot $i_2$ start at a same time and $i_1 = P \cdot i_2$ shown in FIG. 19 is for illustration only. Other embodiments may be used without departing from the scope of the present disclosure.

A UE determines, in step 1910, a power $\hat{P}_{PUSCH,c}(i_1)$ for each PUSCH transmission on each cell c from $C_1^{UL}$ cells in a first slot $i_1$ and a power $\hat{P}_{PUSCH,c}(i_2)$ for each PUSCH transmission on each cell c from $C_2^{UL}$ cells in a second slot $i_2+j$, $0 \leq j \leq P-1$ according to a respective power control process. A duration of the first slot is longer than a duration of the second slot by an integer factor P. The second slot $i_2$ starts at a same time as the first slot $i_1$. In each second slot $i_2+j$, the UE scales, in step 1920, each determined power by a factor $w_c(i_2+j) \leq 1$ so that $$\sum_{c=0}^{C_1^{UL}-1} w_c(i_2+j) \cdot \hat{P}_{PUSCH,c}(i_1) + \sum_{c=0}^{C_2^{UL}-1} w_c(i_2+j) \cdot \hat{P}_{PUSCH,c}(i_2) \leq$$

$$\hat{P}_{CMAX}(i_2+j)$$

and transmits a corresponding PUSCH with the scaled power. The value of $w_c(i_2+j)$ can be the largest value achieving the previous condition and for some cells, the UE can set $w_c(i_2)=0$, for example when a resulting scaled power is too small.

Figure 20:
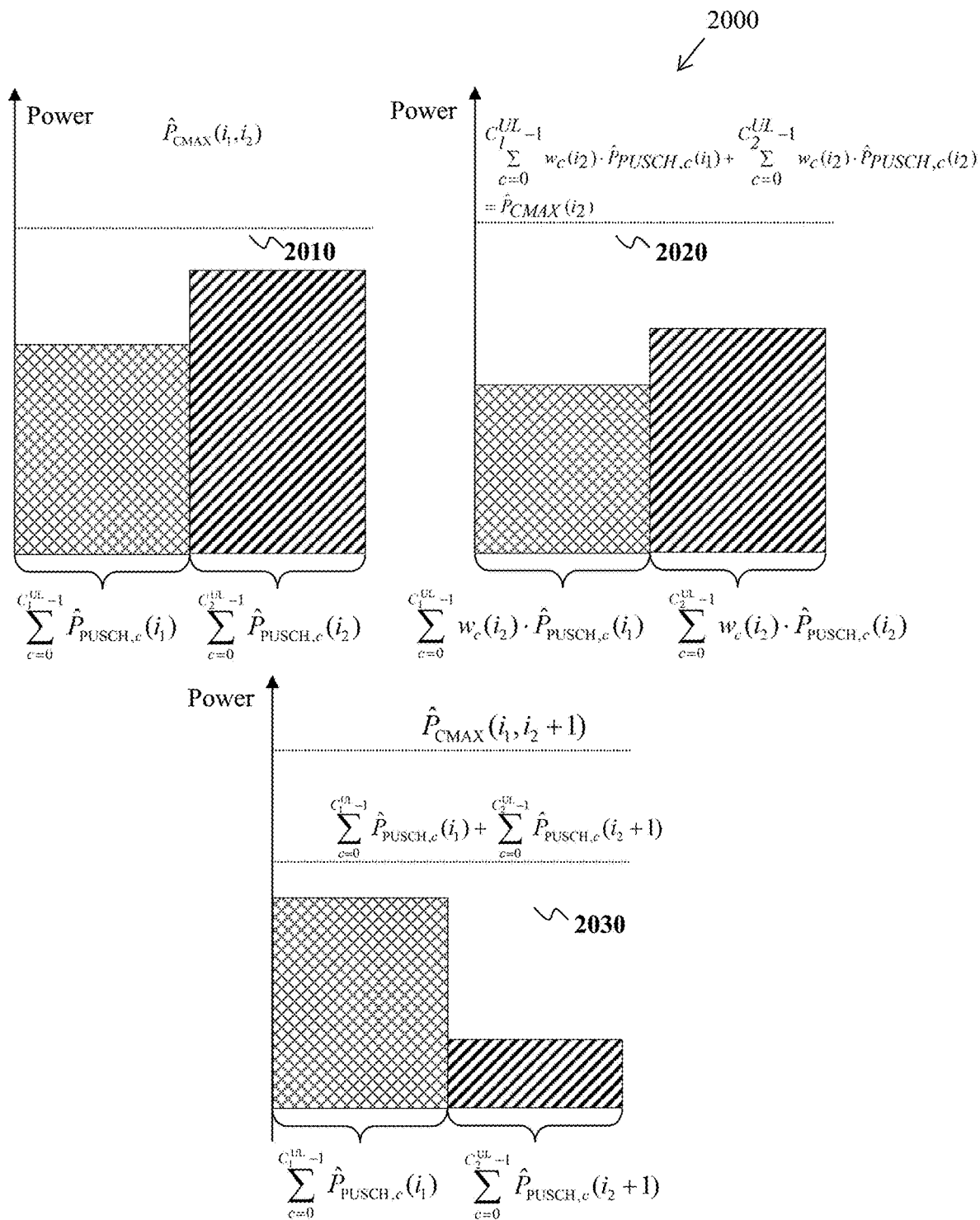
FIG. 20 illustrates an example total PUSCH transmission power on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1=P \cdot i_2$ according to embodiments of the present disclosure.

FIG. 20 illustrates an example total PUSCH transmission power 2000 on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1=P \cdot i_2$ according to embodiments of the present disclosure. An embodiment of the total PUSCH transmission power 2000 on $C_1^{UL}$ cells in a first slot $i_1$ and a total PUSCH transmission power on $C_2^{UL}$ cells in second slots $i_2$ and $i_2+1$ according to PUSCH transmission power when slot $i_1$ and slot $i_2$ start at a same time and $i_1=P \cdot i_2$ shown in FIG. 20 is for illustration only. Other embodiments may be used without departing from the scope of the present disclosure.

A UE determines a power $\hat{P}_{PUSCH,c}(i_1)$ for each PUSCH transmission on each cell c from $C_1^{UL}$ cells in a first slot $i_1$ and a power $\hat{P}_{PUSCH,c}(i_2+j)$ for each PUSCH transmission on each cell c from $C_2^{UL}$ cells in a second slot $i_2+j$, $0 \leq j \leq 1$ according to a respective power control process. The second slot $i_2$ starts at a same time as the first slot $i_1$. A duration of the first slot is twice a duration of the second slot. In the second slot $i_2$ it is $$\sum_{c=0}^{C_1^{UL}-1} \hat{P}_{PUSCH,c}(i_1) + \sum_{c=0}^{C_2^{UL}-1} \hat{P}_{PUSCH,c}(i_2) > \hat{P}_{CMAX}(i_2) \quad 2010.$$

The UE scales by $w_c(i_2)$ each $\hat{P}_{PUSCH,c}(i_1)$ and each $\hat{P}_{PUSCH,c}(i_2)$ for PUSCH transmissions on respective cells so that $$\sum_{c=0}^{C_1^{UL}-1} w_c(i_2) \cdot \hat{P}_{PUSCH,c}(i_1) + \sum_{c=0}^{C_2^{UL}-1} w_c(i_2) \cdot \hat{P}_{PUSCH,c}(i_2) \leq \hat{P}_{CMAX}(i_2) \quad 2020.$$

In a next second slot $i_2+1$ the UE determines a power $\hat{P}_{PUSCH,c}(i_2+1)$ for each PUSCH transmission on each cell from the $C_2^{UL}$ cells according to a corresponding power control process and the UE transmits a PUSCH on a cell c from the $C_1^{UL}$ cells with a power $\hat{P}_{PUSCH,c}(i_1)$ and a PUSCH on a cell c from the $C_2^{UL}$ cells with a power $\hat{P}_{PUSCH,c}(i_2+1)$ since $$\sum_{c=0}^{C_1^{UL}-1} \hat{P}_{PUSCH,c}(i_1) + \sum_{c=0}^{C_2^{UL}-1} \hat{P}_{PUSCH,c}(i_2+1) \leq \hat{P}_{CMAX}(i_2+1)$$

Therefore, the UE transmits a PUSCH on a cell c from the $C_1^{UL}$ cells with a power $w_c(i_2) \cdot \hat{P}_{PUSCH,c}(i_1) < \hat{P}_{PUSCH,c}(i_1)$ during second slot $i_2$ and with a power $\hat{P}_{PUSCH,c}(i_1)$ during second slot $i_2+1$.

In one embodiment for power allocation by a UE, in order to ensure that a minimum transmission power is always available to the UE for transmissions on cells from the $C_1^{UL}$ cells (CG1) and for transmissions on cells from the $C_2^{UL}$ cells (CG2), a gNB can configure to the UE a first minimum available power for transmissions in CG1 and a second minimum available power for transmissions in CG2. The configuration can be by allocating a first percentage, $\delta_{CG1}$, of a minimum available transmission power to CG1 and a second percentage, $\delta_{CG2}$, of a minimum available transmission power to CG2 where $\delta_{CG1}+\delta_{CG2} \leq 1$. When the UE transmits in CG1 in slot $i_1$ and in CG2 in slot $i_2$, the UE can use at least a power of $\delta_{CG1} \cdot \hat{P}_{CMAX}(i_1,i_2)$ for transmissions on CG1 cells and at least a power of $\delta_{CG2} \cdot \hat{P}_{CMAX}(i_1,i_2)$ for transmissions on CG2 cells. Therefore, when power allocation for transmissions on CG1 are prioritized over power allocation for transmissions on CG2, an available power on CG1 in slot $i_1$ can be equal to $\hat{P}_{CMAX}(i_1,i_2)-\min(\hat{P}_{PUSCH}(i_2), \delta_{CG2} \cdot \hat{P}_{CMAX}(i_1,i_2))$ where $\hat{P}_{PUSCH}(i_2)$ is a total power for PUSCH transmissions on CG2.

Applicability for a configuration of a minimum available power for CG1 and CG2 can be restricted to apply only for PUSCH transmissions and SRS transmissions and can be non-applicable for PRACH or PUCCH transmissions. For example, when power allocation to PRACH transmissions is prioritized over power allocation to any other transmissions, when a UE transmits PUSCH and PRACH on CG1 in slot $i_1$ and PUSCH and PRACH on CG2 in slot $i_2$, the UE can use a power up to $\hat{P}_{CMAX}-\hat{P}_{PRACH}(i_1)-\hat{P}_{PRACH}(i_2)-\min(\hat{P}_{PUSCH}(i_2), \max(0,\delta_{CG2} \cdot \hat{P}_{CMAX}(i_1,i_2)-\hat{P}_{PRACH}(i_2)))$ for PUSCH transmissions in CG1.

When power allocation to PUCCH transmission or PUSCH with UCI transmission is prioritized over power allocation to any other transmission except for PRACH transmission, the UE can use a power up to $\hat{P}_{CMAX}(i_1,i_2)-\hat{P}_{PRACH}(i_1)-\hat{P}_{PRACH}(i_2)-\min(\hat{P}_{PUSCH}(i_2), \max(0, \delta_{CG2} \cdot \hat{P}_{CMAX}(i_1,i_2)-\hat{P}_{PRACH}(i_2)))$ for PUCCH or PUSCH with UCI transmission in CG1 when power allocation for PUCCH or PUSCH with UCI transmission in CG1 is prioritized over power allocation for PUCCH or PUSCH with UCI transmission in CG2, for example due to a higher priority of the UCI type in CG1.

Otherwise, when power allocation for PUCCH or PUSCH with UCI transmission in CG2 is prioritized over power allocation for PUCCH or PUSCH with UCI transmission in CG1, a power up to $\hat{P}_{CMAX}(i_1,i_2)-\hat{P}_{PRACH}(i_1)-\hat{P}_{PRACH}(i_2)-\hat{P}_{PUCCH}(i_2)-\min(\hat{P}_{PUSCH}(i_1), \max(0,\delta_{CG1} \cdot \hat{P}_{CMAX}(i_1,i_2)-\hat{P}_{PRACH}(i_1)-\hat{P}_{PUCCH}(i_1)))$ for PUCCH transmissions in CG1 when power allocation for PUCCH transmission in CG2 is prioritized over power allocation for PUCCH transmission in CG1.

In case of equal prioritization for power allocation to a PUCCH or PUSCH with UCI transmission in CG1 and a PUCCH or PUSCH with UCI transmission in CG2, for example when a same UCI type is transmitted in both CGs and a CG is not prioritized over another CG, a power available for PUCCH transmission in CG1 is $\hat{P}_{PUCCH}(i_1)$ when $\delta_{CG1} \cdot \hat{P}_{CMAX}(i_1,i_2)-\hat{P}_{PRACH}(i_1)-\hat{P}_{PRACH}(i_2)-\hat{P}_{PUCCH}(i_1) \geq 0$, $\alpha_c(j)<1$ when $\delta_{CG2} \cdot \hat{P}_{CMAX}(i_1,i_2)-\hat{P}_{PRACH}(i_2)-\hat{P}_{PUCCH}(i_2) \geq 0$, and, otherwise, $w \cdot \hat{P}_{PUCCH}(i_1)$ so that $w \cdot (\hat{P}_{PUCCH}(i_1)+\hat{P}_{PUCCH}(i_2)) \leq \hat{P}_{CMAX}(i_1,i_2)-\hat{P}_{PRACH}(i_1)-\hat{P}_{PRACH}(i_2)$. Similar, a power available for PUCCH transmission in CG2 is $\hat{P}_{PUCCH}(i_2)$ when $\delta_{CG2} \cdot \hat{P}_{CMAX}(i_1,i_2)-\hat{P}_{PRACH}(i_2)-\hat{P}_{PUCCH}(i_2)-\hat{P}_{PUCCH}(i_2) \geq 0$, $\hat{P}_{CMAX}(i_1,i_2)-\hat{P}_{PRACH}(i_1)-\hat{P}_{PRACH}(i_2)-\min(\hat{P}_{PUSCH}(i_1)+\hat{P}_{PUCCH}(i_1), \delta_{CG1} \cdot \hat{P}_{CMAX}(i_1,i_2)-\hat{P}_{PRACH}(i_2)-\hat{P}_{PUCCH}(i_2))$ when $\delta_{CG1} \hat{P}_{CMAX}(i_1,i_2)-\hat{P}_{PRACH}(i_2)-\hat{P}_{PUCCH}(i_2) \geq 0$, and, otherwise, $w \cdot \hat{P}_{PUCCH}(i_2)$ so that $w \cdot (\hat{P}_{PUCCH}(i_1) + \hat{P}_{PUCCH}(i_2)) \leq \hat{P}_{CMAX}(i_1, i_2) - \hat{P}_{PRACH}(i_1) - \hat{P}_{PRACH}(i_2)$.

Same expressions apply for PUSCH with UCI transmission by replacing $\hat{P}_{PUCCH}$ with $\hat{P}_{PUSCH\_UCI}$ in the above expression. Same expressions also apply for PUSCH with a prioritized data service by replacing $\hat{P}_{PUCCH}$ with $\hat{P}_{PUSCH\_priority}$ in the above expression. It is also possible to prioritize UCI transmission in one of the CGs even when a UCI type with same highest priority is transmitted by considering several criteria such as the UCI payload, the existence of additional UCI types, a value of power reduction relative to a value of power determined according to a respective power control formula, or the CG index. For example, when a UE transmits HARQ-ACK and A-CSI in a PUSCH on a CG1 cell and HARQ-ACK in a PUSCH or PUCCH on a CG2 cell, power allocation can be prioritized to the CG1 cell. For example, when the UE transmits HARQ-ACK with 1 bit payload on one cell and HARQ-ACK with 20 bits payload on another cell, the PUCCH transmission with the smaller payload can be prioritized as it requires smaller power.

The following consider that UCI is multiplexed in a single PUSCH transmission but the descriptions can be extended in a straightforward manner when UCI is multiplexed in a PUCCH or when UCI is multiplexed in multiple PUSCH transmissions, or when power allocation to a PUSCH transmission conveying a configured data service type is prioritized. For example, when UCI is multiplexed in a PUCCH, a PUSCH with multiplexed UCI can be replaced by a PUCCH with multiplexed UCI and a duplication of respective descriptions is omitted for brevity. For example, UCI associated with PDSCH transmissions using a first duration can be multiplexed in one or more PUSCH transmissions that also use the first duration and UCI associated with PDSCH transmissions using a second duration can be multiplexed in one or more PUSCH transmissions that also use the second duration. A first slot $i_1$ with a first duration and a second slot $i_2$ with a second duration have a same starting point and all UL transmissions convey data or UCI in respective PUSCHs without any SRS transmission.

When a UE multiplexes UCI in a PUSCH transmission in a first slot $i_1$ on a cell UCI, the UE prioritizes power allocation to the PUSCH transmission and determines a respective transmission power $M_{SC}^{PUSCH-initial}$ according to a corresponding power control process. The UE allocates a transmission power to remaining PUSCH transmissions according to any of the aforementioned embodiments after replacing a corresponding $\hat{P}_{CMAX}$ parameter with $\hat{P}_{CMAX} - \hat{P}_{PUSCH,c_{UCI}}(i_1)$.

When a UE multiplexes UCI in a PUSCH transmission in a second slot $i_2$ on a cell $c_{UCI}$, the UE prioritizes power allocation to the PUSCH transmission and determines a respective transmission power $P_{PUSCH,c_{UCI}}(i_2)$ according to a corresponding power control process. The UE allocates a transmission power to remaining PUSCH transmissions after replacing $\hat{P}_{CMAX}(i_2)$ parameter with $\hat{P}_{CMAX}(i_2) - \hat{P}_{PUSCH,c_{UCI}}(i_2)$ for the aforementioned embodiments or after replacing $\hat{P}_{CMAX}(i_1)$ parameter with $\hat{P}_{CMAX}(i_1) - \hat{P}_{PUSCH,c_{UCI}}(i_2)$ for the aforementioned embodiments.

When a UE multiplexes UCI in a PUSCH transmission in a second slot $i_2+j$, $0<j\leq P-1$ on a cell $c_{UCI}$, whether or not the UE prioritizes power allocation to the PUSCH transmission depends on the PUSCH power allocation embodiment.

For the power allocation embodiment, as a power for PUSCH transmissions on cells from the $C_1^{UL}$ cells in first slot $i_1$ is set prior to second slot $i_2+j$ and remains invariant for the duration of first slot $i_1$ that includes the second slot $i_2+j$, an allocation of power for the PUSCH transmission with UCI in the second slot $i_2+j$ on cell $c_{UCI}$ is not prioritized over an allocation of power for the PUSCH transmissions without UCI in the first slot $i_1$ on cells from the $C_1^{UL}$ cells. Therefore, denoting by $\hat{P}_{PUSCH,c}(i_2+j)$ a power the UE determines according to a respective power control process for PUSCH transmission on cell c in slot $i_2+j$, an actual transmission power on cell $c_{CUI}$ can be determined as $$\hat{P}_{PUSCH,c_{UCI}}(i_2+j) = \min\left\{\hat{P}_{PUSCH,c_{UCI}}(i_2+j), \left(\hat{P}_{CMAX}(i_2+j) - \sum_{c=0}^{C_1^{UL}-1} w_c(i_1) \cdot \hat{P}_{PUSCH,c}(i_1)\right)\right\}$$

A power for remaining PUSCH transmissions on each cell $c \neq c_{UCI}$ from the $C_2^{UL}$ cells in second slot $i_2+j$ is determined as $w_c(i_2+j) \cdot \hat{P}_{PUSCH,c}(i_2+j)$ Subject to $$\sum_{c=0, c \neq c_{UCI}}^{C_2^{UL}-1} w_c(i_2+j) \cdot \hat{P}_{PUSCH,c}(i_2+j) \leq$$

$$\hat{P}_{CMAX}(i_2+j) - \sum_{c=0}^{C_1^{UL}-1} w_c(i_1) \cdot \hat{P}_{PUSCH,c}(i_1) - \hat{P}_{PUSCH,c_{UCI}}(i_2+j)$$

where $w_c(i_2+j) \leq 1$ can be a largest scaling factor that achieves the previous condition.

For the aforementioned power allocation embodiment, a power allocation for the PUSCH transmission with UCI in the second slot $i_2+j$ on cell $c_{UCI}$ and for the remaining PUSCH is same as previously described for the aforementioned power allocation embodiment.

In some embodiments for power allocation, a power allocation for the PUSCH transmission with UCI in the second slot $i_2+j$ on cell $C_{UCI}$ can be prioritized over all other PUSCH transmissions either on cells from the $C_1^{UL}$ cells in first slot it or on cells from the $C_2^{UL}$ cells in second slot $i_2+j$. An actual PUSCH transmission power $w_c(i_2+j) \cdot \hat{P}_{PUSCH,c}(i_1)$ on each respective cell c from the $C_1^{UL}$ cells and an actual PUSCH transmission power $w_c(i_2+j) \cdot \hat{P}_{PUSCH,c}(i_2+j)$ on each respective cell c from the $C_2^{UL}$ cells during second slot $i_2+j$ are determined so that $$\sum_{c=0}^{C_1^{UL}-1} w_c(i_2+j) \cdot \hat{P}_{PUSCH,c}(i_1) + \sum_{c=0, c \neq c_{UCI}}^{C_2^{UL}-1} w_c(i_2+j) \cdot \hat{P}_{PUSCH,c}(i_2+j) \leq$$

$$\hat{P}_{CMAX}(i_2+j) - \hat{P}_{PUSCH,c_{UCI}}(i_2+j).$$

When there is UCI multiplexing in a first PUSCH transmission or in a first PUCCH transmission on a cell from the $C_1^{UL}$ cells in a first slot $i_1$ and there is also UCI multiplexing in a second PUSCH transmission or in a second PUCCH transmission on a cell from the $C_2^{UL}$ cells in a second slot $i_2$ according to the aforementioned embodiments for power allocation or in any second slot $i_2+j$, $0 \leq j \leq P-1$, according to the power prioritization embodiment, power prioritization between the first PUSCH transmission or the first PUCCH transmission and the second PUSCH transmission or the second PUCCH transmission can consider the UCI type. For example, UCI type prioritization can be as HARQ-ACK/

SR>RI>CSI. In case a same UCI type with the highest priority is multiplexed in both the first PUSCH transmission or the first PUCCH transmission and the second PUSCH transmission or the second PUCCH transmission, power prioritization can be predetermined either for the first PUSCH transmission or the first PUCCH transmission associated with the longer slot duration or for the second PUSCH transmission or the second PUCCH transmission associated with the shorter slot duration. For example, power allocation can be prioritized for the PUSCH transmission or the PUCCH transmission with the longer slot duration.

A UE can prioritize power allocation to a PRACH transmission over all other transmissions. When the UE transmits a PRACH in a first slot $i_1$ on a cell c from the $C_1^{UL}$ cells, the UE prioritizes power allocation to the PRACH transmission and determines a respective transmission power $\hat{P}_{PRACH}(i_1)$ according to a corresponding power control process. The UE allocates a transmission power to remaining transmissions according to any of the previously aforementioned embodiments after replacing a corresponding $\hat{P}_{CMAX}$ parameter with $\hat{P}_{CMAX}-\hat{P}_{PRACH}(i_1)$. When the UE transmits a PRACH in a second slot $i_2$ on a cell c from the $C_2^{UL}$ cells, the UE prioritizes power allocation to the PRACH transmission and determines a respective transmission power $\hat{P}_{PRACH}(i_2)$ according to a corresponding power control process. The UE allocates a transmission power to remaining transmissions after replacing $\hat{P}_{CMAX}(i_2)$ parameter with $\hat{P}_{CMAX}(i_2)-\hat{P}_{PRACH}(i_2)$ for the aforementioned embodiments or after replacing $\hat{P}_{CMAX}(i_1)$ parameter with $\hat{P}_{CMAX}(i_1)-\hat{P}_{PRACH}(i_2)$ for the aforementioned embodiments.

When a UE transmits a PRACH in a second slot $i_2+j$, $0<j\leq P-1$ on a cell c from the $C_2^{UL}$ cells, the UE can prioritize power allocation to the PRACH transmission over all other transmissions on cells from the $C_2^{UL}$ cells in second slot $i_2+j$. When the UE reduces, including to zero, a power of ongoing transmissions on cells from the $C_1^{UL}$ cells in first slot $i_1$ when the UE transmits PRACH, the UE can transmit the PRACH with power $\hat{P}_{PRACH}(i_2+j)$ as determined according to a respective power control process. When the UE does not reduce a power of ongoing transmissions on cells from the $C_1^{UL}$ cells in first slot $i_1$, the UE determines a PRACH transmission power as $$\hat{P}_{PRACH}(i_2+j) = \min\left\{\hat{P}_{PRACH}(i_2+j), \left(\hat{P}_{CMAX}(i_2+j) - \sum_{c=0}^{c_1^{UL}-1} w_c(i_1)\cdot\hat{P}_{PUSCH,c}(i_1)\right)\right\}.$$

power for remaining transmissions on cells from the $C_2^{UL}$ cells in second slot $i_2+j$ is determined by replacing $\hat{P}_{CMAX}(i_2+j)$ with $\hat{P}_{CMAX}(i_2+j)-\hat{P}_{PRACH}(i_2-j)$.

A power allocation for SRS transmissions can be with a lowest priority. A UE determines a SRS transmission power on a cell c, $\hat{P}_{SRS,c}$, according to a corresponding power control process. The UE can determine a SRS transmission power as $\hat{P}_{SRS,c}=\min\{\hat{P}_{SRS,c}, \hat{P}_{CMAX}-\hat{P}_{Channel}^{Total}\}$ where $\hat{P}_{Channel}^{Total}$ is a total power the UE allocates for transmission of other channels on all cells in same symbols as the SRS transmission symbols. When SRS transmissions on cells from the $C_1^{UL}$ cells overlap in time with SRS transmissions on cells from the $C_2^{UL}$ cells, such as for example in last symbols of slot $i_1$ and slot $i_2+P-1$, and $$\sum_{c=0}^{c_1^{UL}-1}\hat{P}_{SRS,c} + \sum_{c=0}^{c_2^{UL}-1}\hat{P}_{SRS,c} > \hat{P}_{CMAX} - \hat{P}_{Channel}^{Total},$$

the UE needs to prioritize a power allocation among SRS transmissions. In a first example, overlapped SRS transmissions can have a same priority regardless of respective cells and an equal power scaling can apply to each SRS transmission power to obtain an actual SRS transmission power $w_c\cdot\hat{P}_{SRS,c}$ such that $$\sum_{c=0}^{c_1^{UL}-1} w_c\cdot\hat{P}_{SRS,c} + \sum_{c=0}^{c_2^{UL}-1} w_c\cdot\hat{P}_{SRS,c} \leq \hat{P}_{CMAX} - \hat{P}_{Channel}^{Total}$$

where a scaling factor $w_c$ is same for all cells except for cells where $w_c\cdot\hat{P}_{SRS,c}$ is very small and the UE can set a respective $w_c$ to zero.

One or more first PUSCH transmissions from a UE on respective one or more first cells can convey a first traffic type and one or more second PUSCH transmissions from a UE on respective one or more second cells can convey a second traffic type. The first and second cells can be in a same CG or in different CGs and the first and second PUSCH transmissions can have same durations or different durations. For example, the first traffic type can be associated with ultra-reliable low-latency communication (URLLC) service while the second traffic type can be associated with mobile broadband (MBB) service.

When a UE transmits in a same slot a first number of PUSCHs conveying a first traffic type and a second number of PUSCHs conveying a second traffic type, a gNB can configure the UE to prioritize power allocation to the first traffic type over the second traffic type, for example in order to prioritize service reliability requirements for the first traffic type. The prioritization of power allocation need not only apply for data transmission for the first traffic type, but can also apply to UCI transmission or RA preamble transmission associated with the first traffic type. For example, a UE can determine the traffic type at the physical layer either based from higher layer configuration depending on the traffic type or from numerology, such as transmission duration, used to transmit an associated PUSCH or, as previously mentioned, explicitly through a field in a DL DCI format or in an UL DCI format, or implicitly through a DL DCI format size or an UL DCI format size where, for example, a DL DCI format or an UL DCI format scheduling URLLC traffic has a smaller size than a DL DCI format or an DCI format scheduling MBB traffic. Then, a UE can determine a transmission power for signaling associated with the first traffic type according to respective power control processes and can determine an available transmission power for signaling associated with the second traffic type according to respective power control processes but using $\hat{P}_{CMAX}-\hat{P}_{Traffic1}^{Total}$ instead of $\hat{P}_{CMAX}$ as an available transmission power during a slot.

It is also possible to prioritize power allocation for the first traffic type over UCI transmission for the second traffic type, either in a PUCCH or in a PUSCH, or over PRACH transmission at least on cells configured for service for only the second traffic type. An exception can be when a PUCCH transmission is orthogonally multiplexed with other PUCCH transmissions and a power variation results to non-orthogonal multiplexing, such as for example for PUCCH Formats 1/1a/1b/3. Power allocation to PUSCH transmissions can also be prioritized over power allocation for PUCCH transmission associated with a same traffic type as achieving a data TB BLER can be prioritized over achieving a UCI BLER. For example, whether such prioritization applies can be explicitly configured to the UE by a gNB. In general, a gNB can configure a UE (by higher layers or through DCI formats) prioritizations for power allocations among UCI types and data types.

Figure 21:
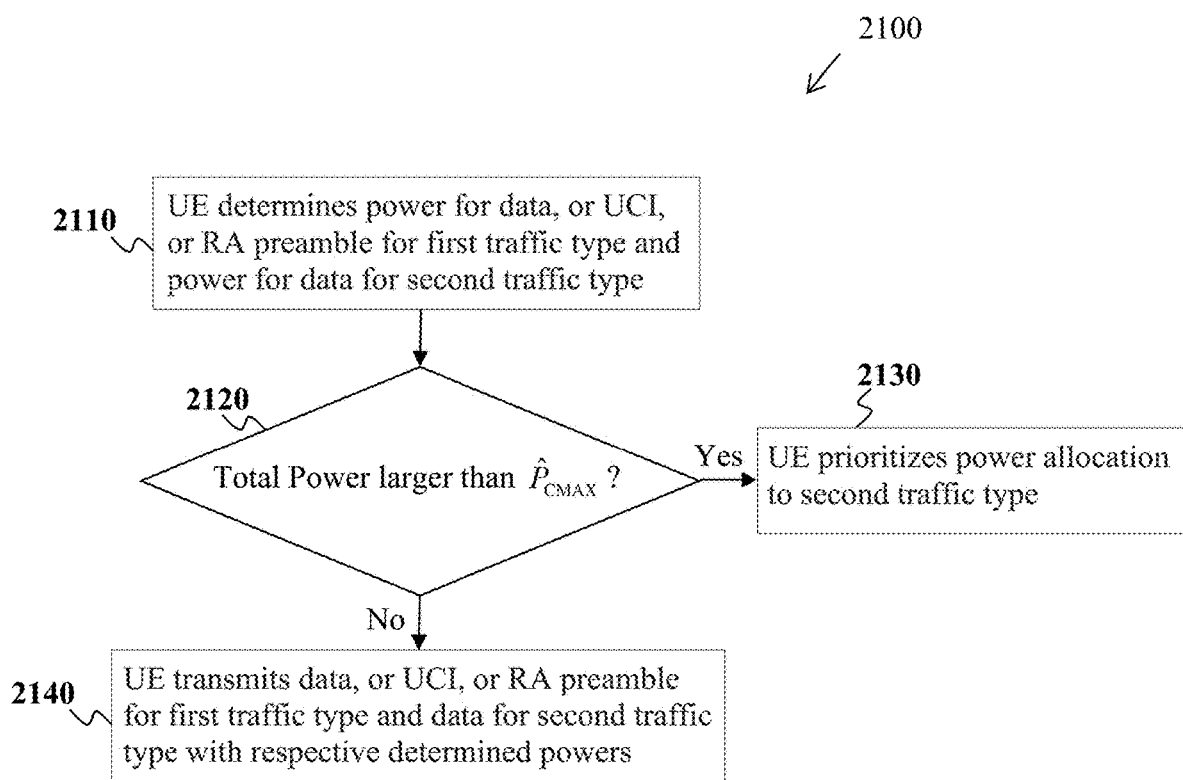
FIG. 21 illustrates an example power allocation from a UE to different traffic types according to embodiments of the present disclosure.

FIG. 21 illustrates an example power allocation 2100 from a UE to different traffic types according to embodiments of the present disclosure. An embodiment of the power allocation 2100 from a UE to different traffic types shown in FIG. 21 is for illustration only. Other embodiments may be used without departing from the scope of the present disclosure.

In step 2110, a UE determines a power for data, or UCI, or random access preamble transmissions associated with a first traffic type and a power for data transmission associated with a second traffic type during a slot where the second traffic type has a higher priority that the first traffic type. The UE determines, in step 2120, whether a total transmission power for the transmissions associated with the first traffic type and with the second traffic type is larger than a configured maximum transmission power during the slot. When the total transmission power for the transmissions associated with the first traffic type and with the second traffic type is larger than a configured maximum transmission power during the slot, the UE prioritizes power allocation to the data transmission of the second traffic type in step 2130; otherwise, the UE transmits the data, or UCI, or random access preamble associated with a first traffic type and the data associated with the second traffic type with the respective determined powers in step 2140.

In general, a PDCCH, PDSCH, PUCCH, or PUSCH transmission can start at any symbol. Also, at least a PDSCH transmission or a PUSCH transmission can have a dynamically varying duration ranging from one symbol to one or more slots. Then, transmissions from a UE can partially overlap in time and the UE cannot determine a power for all overlapping transmissions at a same time. Further, a time between a UL DCI format detection and an associated PUSCH transmission can be variable and a UE cannot always determine an available power at a time of the PUSCH transmission as, after the UL DCI format detection, the UE can be configured additional transmissions to occur at the time of the PUSCH transmission. Similar argument apply for a time between DL DCI format detection, an associated PDSCH reception, and an associated HARQ-ACK transmission in a PUCCH. Also, PDCCH transmissions conveying UL DCI formats that schedule PUSCH transmissions can have an arbitrary periodicity ranging from one symbol to tens of symbols.

For a UE to determine a power for a first UL transmission at time T, the UE needs to first determine an available power, $\hat{P}_{available}(T)$, for the first UL transmission at time T. The UE can subtract from $\hat{P}_{CMAX}$ at time T the power for $N_{ongoing}$ ongoing transmissions that extend to time T and the power of $N_{next}$ upcoming (but not currently ongoing) transmissions that the UE determines prior to determining a power for the first UL transmission. Then, the UE can determine as $$\hat{P}_{available}(T) = \hat{P}_{CMAX}(T) - \sum_{i=0}^{N_{current}} \hat{P}_{current}(i, T) - \sum_{i=0}^{N_{next}} \hat{P}_{next}(i, T)$$

or, by combining all $N_{known}$ transmissions that the UE has already determined a required power time T, as $$\hat{P}_{available}(T) = \hat{P}_{CMAX}(T) - \sum_{i=0}^{N_{known}} \hat{P}_{known}(i, T).$$

When multiple transmissions start at time T, the UE can distribute $\hat{P}_{available}(T)$ among the multiple transmissions as previously described and power allocation prioritizations according to information type can apply.

For operation with two CGs and a minimum guaranteed power per CG, the available power at a first CG needs to consider the power used in a second CG and the guaranteed power at the second CG. For example, a UE can determine an available transmission power in a first CG as in Equation 3.

$$\hat{P}_{available}(T, 1) = \hat{P}_{CMAX}(T, T-1) - \sum_{i=0}^{N_{known}} \hat{P}_{known}(i, T, 1) - \max\left(\hat{P}_{CMAX}(T, T-1) \cdot \delta_{CG2}, \sum_{i=0}^{N_{known}} \hat{P}_{known}(i, T-1, 2)\right)$$ Equation (3)

Figure 22:
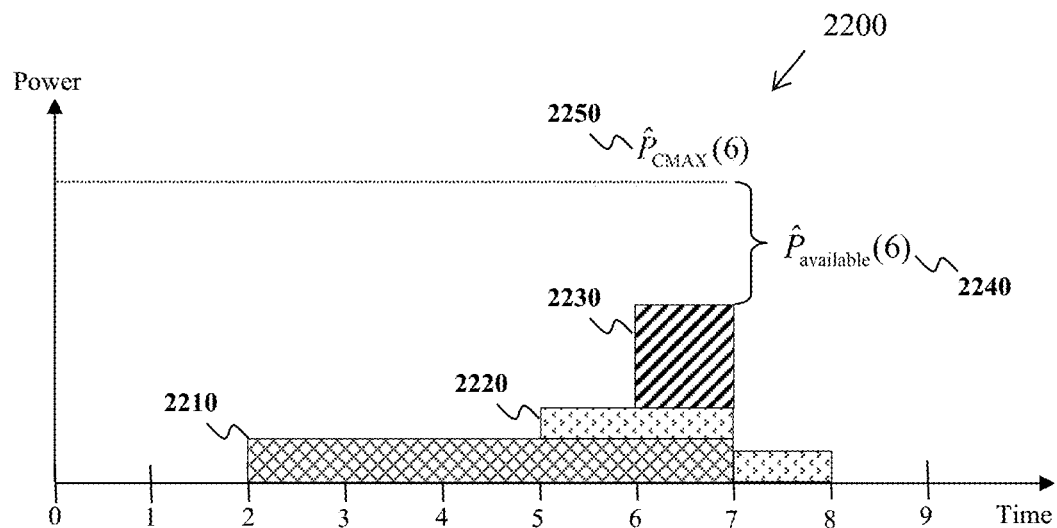
FIG. 22 illustrates an example determination by a UE of an available transmission power at a time T when the UE determines a total power for all earlier transmissions before a power for a later transmission according to embodiments of the present disclosure.

FIG. 22 illustrates an example determination by a UE of an available transmission power at a time T when the UE determines a total power for all earlier transmissions before a power for a later transmission according to embodiments of the present disclosure. An embodiment of the determination of an available transmission power at a time T shown in FIG. 22 is for illustration only. Other embodiments may be used without departing from the scope of the present disclosure.

A UE first determines a power 2210 for a first UL transmission with duration of 5 time units that starts at time unit 2 and has duration of 5 times units. A time unit can be one symbol, a number of symbols such as one slot, and so on. For example, the UL transmission can be a PUSCH transmission or a PUCCH transmission. The UE next determines a power 2220 for a second UL transmission with duration of 3 time units that starts at time unit 5 and has duration of 3 times units. The UE next determines a power 2230 for a third UL transmission with duration of 1 time unit that starts at time unit 6 and has duration of 1 time unit. The UE next determines an available transmission power 2240 for a fourth UL transmission that starts at time unit 6, regardless of a respective duration, as the difference between a maximum transmission power $\hat{P}_{CMAX}(6)$ 2250 the UE is configured at time unit 6 and a total transmission power $$\sum_{i=0}^{2} P_{known}(i, 6)$$

of known transmissions at time unit 6. Even though the third and fourth UL transmissions start at a same time unit, the UE can determine the power for the third UL transmission prior to the power of the fourth UL transmissions, for example because the UE detected a DCI format configuring the third UL transmission prior to detecting a DCI format configuring the fourth UL transmission. Detections by the UE of DCI formats configuring any of the above UL transmissions can be in any order although typically they are in a same order as a determination of respective transmission powers and durations. It is also possible that the UE first determines the power of the third UL transmission after determining an intermediate power of the fourth UL transmission and the UE also determines that the third UL transmission has higher priority than the fourth UL transmission and the UE has enough time to adjust the power for the fourth UL transmission prior to time unit 6. In general, when a UE has sufficient time to adjust a power for all UL transmissions that start at a same time unit, LTE power prioritization rules can apply.

The above operation can be generalized to multiple CGs with respective multiple guaranteed minimum transmission powers. Within a CG, prioritization rules for power allocation can be similar to LTE operation and, in case of multiple service types, can additionally consider a data service type.

Figure 23:
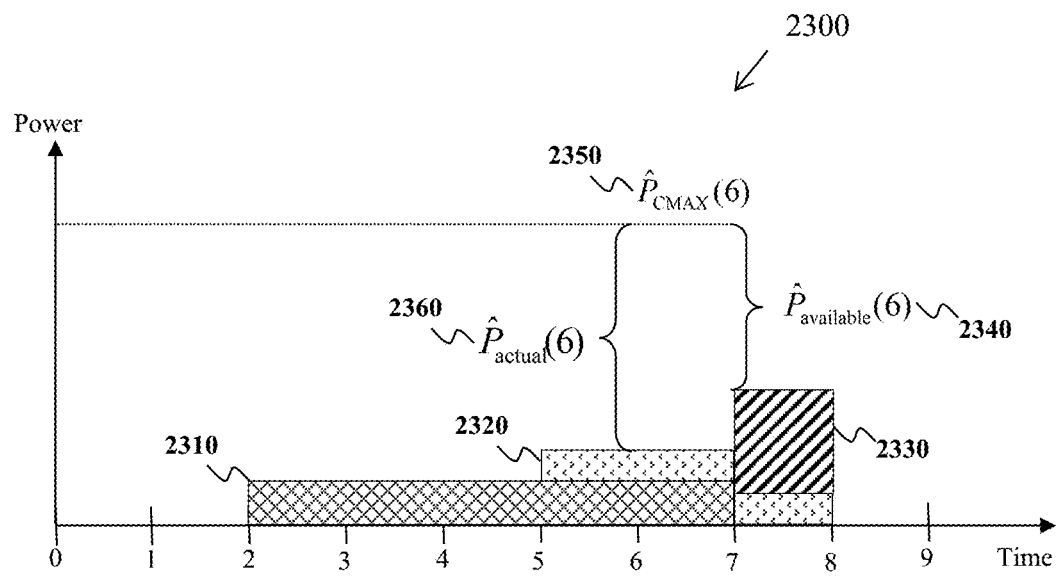
FIG. 23 illustrates an example determination by a UE of an available transmission power at a time T when the UE does not determine a total power for all earlier transmissions before a power for a later transmission according to embodiments of the present disclosure.

FIG. 23 illustrates an example determination by a UE of an available transmission power at a time T when the UE does not determine a total power for all earlier transmissions before a power for a later transmission according to embodiments of the present disclosure. An embodiment of the determination of an available transmission power at a time Tshown in FIG. 23 is for illustration only. Other embodiments may be used without departing from the scope of the present disclosure.

A UE first determines a power 2310 for a first UL transmission with duration of 5 time units that starts at time unit 2 and has duration of 5 times units. A time unit can be one symbol, a number of symbols such as one slot, and so on. For example, the UL transmission can be a PUSCH transmission or a PUCCH transmission. The UE next determines a power 2320 for a second UL transmission with duration of 3 time units that starts at time unit 5 and has duration of 3 times units. The UE next determines a power 2330 for a third UL transmission with duration of 1 time unit that starts at time unit 7 and has duration of 1 time unit (or any number of time units). The UE next determines an available transmission power 2340 for a fourth UL transmission that starts at time unit 6, regardless of a respective duration, as the difference between a maximum transmission power $\hat{P}_{CMAX}(6)$ 2350 the UE is configured at time unit 6 and a total transmission power of known transmissions $$\sum_{i=0}^{2} P_{known}(i, 6)$$

that is reserved at time unit 6. Even though the third UL transmission starts after the fourth UL transmission, the UE can determine the power for the third UL transmission prior to the power of the fourth UL transmissions, for example because the UE detected a DCI format configuring the third UL transmission prior to detecting a DCI format configuring the fourth UL transmission. Therefore, for the fourth UL transmission starting at time unit 6, the UE considers a smaller available power than an actual available power $\hat{P}_{actual}(6)$ 2360. When the fourth transmission has a higher priority that the third transmission and the UE does not have enough time to recalculate the power for the third transmission, the UE can drop the fourth transmission.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a terminal in a wireless communication system, the method comprising:
   receiving, from a base station, first downlink control information (DCI) scheduling a first physical downlink shared channel (PDSCH), the first DCI including a first information associated with a slot offset between the first PDSCH and hybrid automatic repeat request acknowledgement (HARQ-ACK) information for the first PDSCH;
   receiving, from the base station, second DCI scheduling a second PDSCH, the second DCI including a second information associated with a slot offset between the second PDSCH and HARQ-ACK information for the second PDSCH;
   receiving, from the base station, the first PDSCH based on the first DCI;
   receiving, from the base station, the second PDSCH based on the second DCI;
   transmitting, to the base station, the HARQ-ACK information for the first PDSCH and the HARQ-ACK information for the second PDSCH in a physical uplink control channel (PUCCH) in a same slot, in case that a first slot corresponding to the first information and a second slot corresponding to the second information are same; and
   transmitting, to the base station, the HARQ-ACK information for the first PDSCH in a PUCCH in the first slot and the HARQ-ACK information for the second PDSCH in a PUCCH in the second slot, in case that the first slot and the second slot are different.

2. The method of claim 1, wherein a HARQ-ACK codebook including at least one bit of the HARQ-ACK information for the first PDSCH and at least one bit of the HARQ-ACK information for the second PDSCH is transmitted in the PUCCH in the same slot.

3. The method of claim 1, wherein each value of the first information and the second information corresponds to one among a plurality of predetermined slots.

4. The method of claim 1, wherein the first DCI further includes downlink assignment index (DAI) information for the first PDSCH, and the HARQ-ACK information for the first PDSCH is generated based on the DAI information for the first PDSCH, and
   wherein the second DCI further includes DAI information for the second PDSCH, and the HARQ-ACK information for the second PDSCH is generated based on the DAI information for the second PDSCH.

5. A method performed by a base station in a wireless communication system, the method comprising:
   transmitting, to a terminal, first downlink control information (DCI) scheduling a first physical downlink shared channel (PDSCH) the first DCI including a first information associated with a slot offset between the first PDSCH and hybrid automatic repeat request acknowledgement (HARQ-ACK) information for the first PDSCH;

transmitting, to the terminal, second DCI scheduling a second PDSCH, the second DCI including a second information associated with a slot offset between the second PDSCH and HARQ-ACK information for the second PDSCH;

transmitting, to the terminal, the first PDSCH based on the first DCI;

transmitting, to the terminal, the second PDSCH based on the second DCI;

receiving, from the terminal, the HARQ-ACK information for the first PDSCH and the HARQ-ACK information for the second PDSCH in a physical uplink control channel (PUCCH) in a same slot, in case that a first slot corresponding to the first information and a second slot corresponding to the second information are same; and receiving, from the terminal, the HARQ-ACK information for the first PDSCH in a PUCCH in the first slot and the HARQ-ACK information for the second PDSCH in a PUCCH in the second slot, in case that the first slot and the second slot are different.

6. The method of claim 5, wherein a HARQ-ACK codebook including at least one bit of the HARQ-ACK information for the first PDSCH and at least one bit of the HARQ-ACK information for the second PDSCH is received in the PUCCH in the same slot.

7. The method of claim 5, wherein each value of the first information and the second information corresponds to one among a plurality of predetermined slots,
wherein the first DCI further includes downlink assignment index (DAI) information for the first PDSCH, and the HARQ-ACK information for the first PDSCH is based on the DAI information for the first PDSCH, and
wherein the second DCI further includes DAI information for the second PDSCH, and the HARQ-ACK information for the second PDSCH is based on the DAI information for the second PDSCH.

8. A terminal in a wireless communication system, the terminal comprising:
a transceiver configured to transmit and receive a signal; and
a controller configured to:
receive, from a base station, first downlink control information (DCI) scheduling a first physical downlink shared channel (PDSCH) the first DCI including a first information associated with a slot offset between the first PDSCH and hybrid automatic repeat request acknowledgement (HARQ-ACK) information for the first PDSCH,
receive, from the base station, second DCI scheduling a second PDSCH, the second DCI including a second information associated with a slot offset between the second PDSCH and HARQ-ACK information for the second PDSCH,
receive, from the base station, the first PDSCH based on the first DCI,
receive, from the base station, the second PDSCH based on the second DCI,
transmit, to the base station, the HARQ-ACK information for the first PDSCH and the HARQ-ACK information for the second PDSCH in a physical uplink control channel (PUCCH) in a same slot, in case that a first slot corresponding to the first information and a second slot corresponding to the second information are same, and
transmit, to the base station, the HARQ-ACK information for the first PDSCH in a PUCCH in the first slot and the HARQ-ACK information for the second PDSCH in a PUCCH in the second slot, in case that the first slot and the second slot are different.

9. The terminal of claim 8, wherein a HARQ-ACK codebook including at least one bit of the HARQ-ACK information for the first PDSCH and at least one bit of the HARQ-ACK information for the second PDSCH is transmitted in the PUCCH in the same slot.

10. The terminal of claim 8, wherein each value of the first information and the second information corresponds to one among a plurality of predetermined slots.

11. The terminal of claim 8, wherein the first DCI further includes downlink assignment index (DAI) information for the first PDSCH, and the HARQ-ACK information for the first PDSCH is generated based on the DAI information for the first PDSCH, and
wherein the second DCI further includes DAI information for the second PDSCH, and the HARQ-ACK information for the second PDSCH is generated based on the DAI information for the second PDSCH.

12. A base station in a wireless communication system, the base station comprising:
a transceiver configured to transmit and receive a signal; and
a controller configured to:
transmit, to a terminal, first downlink control information (DCI) scheduling a first physical downlink shared channel (PDSCH) the first DCI including a first information associated with a slot offset between the first PDSCH and hybrid automatic repeat request acknowledgement (HARQ-ACK) information for the first PDSCH,
transmit, to the terminal, second DCI scheduling a second PDSCH, the second DCI including a second information associated with a slot offset between the second PDSCH and HARQ-ACK information for the second PDSCH,
transmit, to the terminal, the first PDSCH based on the first DCI,
transmit, to the terminal, the second PDSCH based on the second DCI,
receive, from the terminal, the HARQ-ACK information for the first PDSCH and the HARQ-ACK information for the second PDSCH in a physical uplink control channel (PUCCH) in a same slot, in case that a first slot corresponding to the first information and a second slot corresponding to the second information are same, and
receive, from the terminal, the HARQ-ACK information for the first PDSCH in a PUCCH in the first slot and the HARQ-ACK information for the second PDSCH in a PUCCH in the second slot, in case that the first slot and the second slot are different.

13. The base station of claim 12, wherein a HARQ-ACK codebook including at least one bit of the HARQ-ACK information for the first PDSCH and at least one bit of the HARQ-ACK information for the second PDSCH is received in the PUCCH in the same slot.

14. The base station of claim 12, wherein each value of the first information and the second information corresponds to one among a plurality of predetermined slots.

15. The base station of claim 12, wherein the first DCI further includes downlink assignment index (DAI) information for the first PDSCH, and the HARQ-ACK information for the first PDSCH is based on the DAI information for the first PDSCH, and wherein the second DCI further includes DAI information for the second PDSCH, and the HARQ-ACK information for the second PDSCH is based on the DAI information for the second PDSCH.

* * * * *